(12) United States Patent
Davis

(10) Patent No.: US 10,731,064 B1
(45) Date of Patent: Aug. 4, 2020

(54) HEAT TRANSFER FLUID COORDINATION ENTITIES

(71) Applicant: Bob Lee Davis, Roseburg, MI (US)

(72) Inventor: Bob Lee Davis, Roseburg, MI (US)

( * ) Notice: Subject to any disclaimer, the term of this patent is extended or adjusted under 35 U.S.C. 154(b) by 0 days.

(21) Appl. No.: 15/847,878

(22) Filed: Dec. 19, 2017

Related U.S. Application Data

(63) Continuation-in-part of application No. 13/731,608, filed on Dec. 31, 2012.

(51) Int. Cl.
*C09K 5/04* (2006.01)

(52) U.S. Cl.
CPC .............. *C09K 5/041* (2013.01); *C09K 5/045* (2013.01); *Y02P 20/124* (2015.11)

(58) Field of Classification Search
CPC ........... C10M 171/008; C10N 2030/00; C10N 2030/06; C10N 2040/30; C09K 5/041; C09K 5/045; Y02P 20/124
USPC .............................................. 252/68; 62/468
See application file for complete search history.

(56) References Cited

U.S. PATENT DOCUMENTS

| | | | | |
|---|---|---|---|---|
| 7,252,779 B2* | 8/2007 | Mosier | ................... | C07C 67/03 252/67 |
| 8,236,194 B1* | 8/2012 | Bredsguard | ........... | C09K 5/044 252/67 |
| 2002/0017629 A1* | 2/2002 | Mosier | ................... | C07C 67/03 252/71 |
| 2004/0262567 A1* | 12/2004 | Wilson | ................... | C09K 5/041 252/68 |
| 2007/0092545 A1* | 4/2007 | Bale | ....................... | A01N 25/06 424/405 |
| 2011/0012052 A1* | 1/2011 | Van Horn | .............. | C09K 5/044 252/68 |
| 2012/0172609 A1* | 7/2012 | Bredsguard | ........... | C07C 69/675 554/122 |
| 2013/0233012 A1* | 9/2013 | Davis | ..................... | C09K 5/045 62/498 |
| 2013/0234059 A1* | 9/2013 | Davis | ..................... | C09K 5/045 252/67 |
| 2013/0234060 A1* | 9/2013 | Davis | ..................... | C09K 5/045 252/68 |
| 2013/0234061 A1* | 9/2013 | Davis | .................. | C10M 105/24 252/68 |

* cited by examiner

*Primary Examiner* — Douglas J McGinty
(74) *Attorney, Agent, or Firm* — Cargill & Associates, PLLC; Lynn E. Cargill

(57) ABSTRACT

Compositions comprising an activated oil blend in a coordination entity are provided. Also provided are compositions comprising a haloalkane complex can be used as a refrigerant. The compositions can increase the energy efficiency and reduces leakage rates of refrigeration systems. Some compositions comprise at least 0.1 wt % of an oleic oil fatty acid, 0.1 wt % of a linoleic oil fatty acid, and at least 98 wt % of a heat transfer fluid including, for example R-134a. Some compositions comprise an oil blend comprising an oleic acid to linoleic acid ratio of approximately 60:1. At least some of the heat transfer fluid can be complexed with at least one of the organic oil fatty acids.

13 Claims, 17 Drawing Sheets

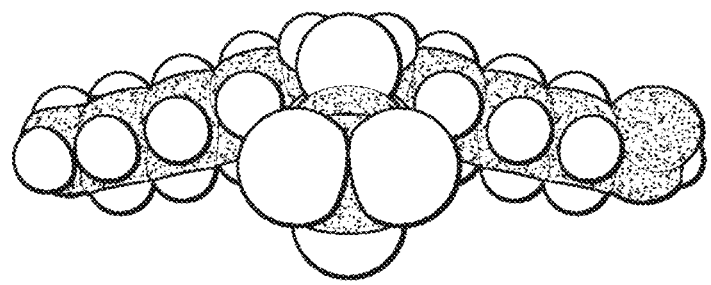
Chemical formula for r-134a
complexed with oleic acid 210
*FIG. 2C*
*FIG. 3*
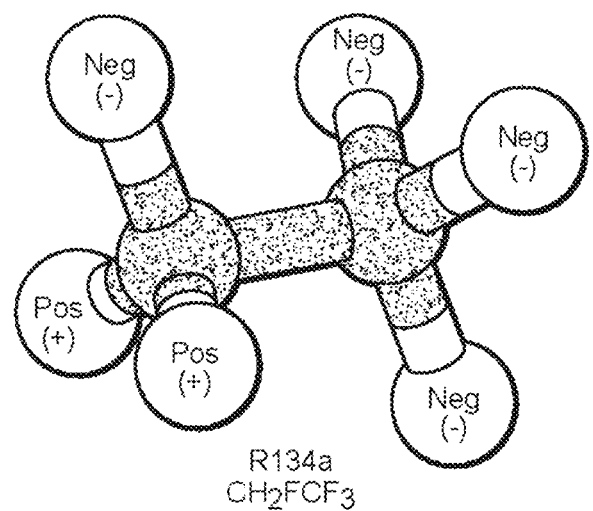
R134a
CH₂FCF₃

HEAT TRANSFER FLUID COORDINATION ENTITIES

CROSS-REFERENCE TO RELATED APPLICATIONS

This application is a Continuation-In-Part of U.S. Utility patent application Ser. No. 13/731,608, filed on Dec. 31, 2012. This application claims the benefit of priority to U.S. provisional application No. 61/608,954, filed on Mar. 9, 2012 and U.S. Utility patent application Ser. No. 13/731,608, filed on Dec. 31, 2012 in the name of the sole inventor, Robert Lee Davis, who owns all the right, title and interest to this invention. Referring back to provisional patent application No. 61/608,954, filed on Mar. 9, 2012, this and all other extrinsic materials discussed herein are incorporated by reference in their entirety. Where a definition or use of a term in that incorporated reference is inconsistent or contrary to the definition of that term provided in this instant application, the definition of that term provided herein applies and the definition of that term in the reference does not apply.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS WEB)

Not Applicable

STATEMENT REGARDING PRIOR DISCLOSURES BY THE INVENTOR OR A JOINT INVENTOR

Not Applicable

BACKGROUND OF THE INVENTION

1. Field of the Invention

The present invention relates to heat transfer fluids, and more particularly, the invention relates to heat transfer fluids suitable for use as refrigerants, fire suppressants, medical propellants, and blowing agents, among other common uses for heat transfer fluids.

2. Description of the Prior Art

Heat transfer fluids have historically been used for refrigerants and other industrial and medical uses. Although there has been a multi-decade quest for addressing environmental concerns when researching for capable heat transfer fluids, there has not yet been found a single perfect refrigerant for diverse air conditioning, refrigeration, medical and industrial applications that does not present new environmental challenges.

The predominant environmental concerns were the holes being formed in the ozone layer, which allowed solar radiation to penetrate the ozone layer, as well as the build-up of greenhouse gases, which trap solar radiation and contribute to global warming. To address these concerns, researchers developed a mission to find chemical compositions that exhibited low ozone depletion potentials (ODP's) and low global warming potentials (GWP's). Although achieving a low ODP was a relatively simple task, achieving low GWP's without high flammability has been more of a challenge. Further confounding the quest is the desire for a refrigerant that exhibits a high capacity, ie. a refrigerant that is capable of bringing down the temperature of the containment area to be cooled. Some refrigerants are less capable than others in this regard, so researchers found that adding flammable gases, such as propane, butane and the like, gave more "capacity", although increasing the undesired flammability.

Focusing on the refrigeration and/or air conditioning industry, the predominant favored chemicals recognized were certain halocarbons (CFCs, HCFCs, and HFCs), which became the established standard for the HVAC&R industry because of their combined efficiency and safety within acceptable price ranges for industrial, automotive, and even individual consumer costs. However, scientific studies in the mid-1980's confirmed that HCFC's contribute to ozone depletion potential (ODP), so HCFC's soon fell out of favor.

In their struggle for the perfect refrigerant, chemical industry giants developed HFCs that worked well and had zero ODP. However, in a attempt to find a low GWP composition, a new problem was discovered that most HFCs contributed greatly to the aforementioned problem of global warming potential (GWP). The Montreal Protocol has eliminated ODP by requiring replacement of CFCs and HCFCs with HFCs such as R-410A, R-407C, and R134a. The nearly unanimous consensus in the global climate community is that high GWP exacerbates climate change, so the focus shifted to development of a next-generation refrigerant with low GWP that still offers the efficiency and affordability that the market demands. New refrigerants were examined for their capacity, chemical compatibility, low flammability values, and future utility as a lower GWP replacement for existing HCFCs and as a more energy conserving replacement for existing HFCs.

The chemical industry relied on technology based on vapor compression cycles that relied on thermally dynamic fluids that cooled as they evaporated and cycled back to fluids exchanging cold air with the warm air being pumped over the cooling coils of air conditioners. The chemical industry needed to provide high-performance refrigerants that were considered to be safe, chemically stable, efficient, and affordable.

In that regard, fluorocarbons dominated the market, all but replacing toxic sulfur dioxide and ammonia, as well as the highly combustible hydrocarbons used by an elite few earlier in the 20th century. These refrigerants accounted for a shift in the preservation of food-stuffs, medicine, and creature comforts that have become the norm for the middle-class and in fact every station above poverty throughout the world.

Research institutions produced many scholarly papers focusing on various potential options including "natural" refrigerants such as carbon dioxide (CO2), hydrocarbons (HC), and ammonia (NH3) as well as hydrofluoro olefins (HFO's) and HFO/HFC blends. All of the evidence to date has shown that "natural" refrigerants, although lowest in GWP, are difficult and costly to work with, and have been found to be often flammable. HFO's, although very low in GWP, carry distinct disadvantages in that they are flammable, and lacking in capacity to HFCs.

Greenhouse gases (GHGs), such as hydrofluorocarbons (HFCs) have been found to contribute significantly to climate change by the Environmental Protection Agency (EPA) and NASA, which have investigated the use of HFCs. HFCs are currently used heavily in the air conditioning, carpeting, drug, and the electronics industries. In addition, they are used as tracers in atmospheric studies and have some medical applications. These greenhouse gases (HFCs), which possess carbon-fluorine bonds, are known to absorb heavily in the atmospheric infrared (IR) window. The relative climate impact of these gases, as expressed by the global warming potential (GWP), are sometimes thousands of times that of CO2 due to their inherent ability to absorb radiation within the Earth's atmospheric IR window (IRW).

The GWP is defined as the ratio of the time-integrated radiative forcing from the instantaneous release of one kilogram of a trace substance relative to that of one kilogram of a reference gas, which is usually taken to be CO2. The radiative forcing of a molecule has been shown to depend on its radiative efficiency and atmospheric abundance. A large molecular radiative efficiency has been shown to arise when a molecule exhibits a large infrared absorption intensity within the IR window due to large dipole derivatives of highly polar bonds. Moreover, HFCs tend to possess long atmospheric lifetimes since carbon-fluorine bonds are generally not very reactive with hydroxyl radicals in the atmosphere. All of these factors lead to a large global warming potential.

As can be noted, more is needed to be considered than the GWP alone. Environmental policy throughout developed countries are now considering the indirect effects of increased CO2 emissions for less efficient refrigerants, and not just the direct global warming (GWP) of the refrigerant.

The metrics of a more inclusive standard for the effect of a chemical on global warming has been designated as Total Equivalent Warming Impact (TEWI), which is considered to be a more reliable indicator when determining the ultimate environmental impact of a refrigerant. The TEWI method balances a refrigerant's direct GWP, charge level, leakage emissions, and efficiency and energy use of the refrigerant in actual systems. New refrigerants must be designed to address both of these metrics in determining the best possible comparison of refrigerants for each application. Lifecycle costs and safety are also considered when evaluating the overall impact of the replacement refrigerant. Corrosion resistance becomes critical in this matrix, and is evaluated in this presentation, as corrosion around the tiny orifices produce fertile grounds for leaks of the refrigerant gas.

An important advent of post-World War II America has been the widespread use of modern, effective, and affordable air conditioning. This soon became a necessity for the hot climate in the South and Southwestern States of the United States of America. By the mid-1950's, air conditioning (and refrigeration) was growing so quickly that new power plants had to be built throughout the country in order to satisfy the demand for electricity that this phenomenon had created.

The refrigerant fluids used in the ever increasing number of air conditioners and chillers were investigated. In 1985, Joe Farman, Brian Gardiner and Johnathan Shanklin published their findings that refrigerants containing chlorine (such as R-12) were found to diffuse up into the stratosphere. NASA confirmed their finding by satellite imagery later that same year. The international community, led by the United Nations quickly ratified the 1989 treaty known as the Montreal Protocol that would move to limit and eventually ban chlorinated gases by 2020, paving the way for a more suitable fluid.

Thereafter, further study implicated the HCFCs used widely in unitary air conditioning as being deleterious, such as R-22, despite its low Ozone Depleting Potential (ODP). The resulting ban of HCFCs from new equipment as of Jan. 1, 2010 in the U.S. except for aftermarket services, and complete phase-out of R22 by 2020 has led to a shortage of R22 for aftermarket services with a drastic spike in prices that will only increase as the ban grows ever closer. Recycling R-22 for replacement back into the air conditioning units that used R-22 has become a big business, although it is not destined to be so far into the future.

Although chlorofluorocarbons (CFC's) have been mostly replaced in most US applications, HFC-134a, and blends such as HFC R-410A and HFC R-407C persist as the most used refrigerants for most HVAC & R applications. The effects of these widely accepted refrigerants with high GWP greenhouse gas (GHG) has been modeled and received ubiquitous validation over the past decade. The duration and effect on the atmosphere of these high GWP gases has led to companies looking for ways to improve performance in lower GWP refrigerants that do not sacrifice capacity for lower GWP, as has been observed in many of the HFO refrigerant replacements. Lower capacity results in more continuous running of equipment which equates to premature replacement of equipment and higher energy demands. Higher energy demands on power plants generally mean that more greenhouse gases are produced in order to provide sufficient air conditioning.

As leakage is a major component of the GWP value for any particular refrigerant fluid, leakage of refrigerants into the atmosphere is one of the major concerns. While stationary air conditioning and refrigeration equipment shipped from the factory with sealed refrigeration systems have been found to have a relatively low leak rate of about 2% by volume annually, most of the refrigerant observed to leak into the atmosphere comes from automotive and other transportation forms of air conditioning and refrigeration. Large cold-chain storage and supermarkets have been reported to leak up to 30% annually, which is especially problematic.

The American Council for an Energy-Efficient Economy, published a paper in 2010 by Hung Pham and Harvey Sachs, in which they stated that "Indeed, climate preservation concerns broadened since the original CFC discoveries. In the upper atmosphere, the carbon-fluorine bond in fluorocarbons acts like carbon dioxide, reflecting longer-wave infrared radiated by the warm earth back to the earth, contributing to climate change through anthropogenic global warming. Thus, atmospheric chemists and policymakers now consider the Global Warming Potential (GWP) of refrigerants, not just their ODP."

The European Union had proposed to ban the use of refrigerants with GWP>150 after 2011, effectively banning R134a in new mobile A/C, however, no acceptable replacement for R134A had been thoroughly tested and accepted so the 2011 deadline passed unmet. Recently, the U.S. Congress proposed to phase down the production of HFCs based solely on their GWP value, effectively banning R134A. Zeotropic blends like R407C which is made from R-32, R-125, and R-134A would also be included in this proposed ban. R-410A is also an HFC and a zeotropic blend of R-32 and R125.

The direct global warming from high leak rate in the above-mentioned mobile air conditioning units, along with Supermarket Refrigeration and Refrigerated Transport, relative to energy use is much higher (30-50% of the total) than that in unitary stationary Air Conditioner units where the leakage contribution is much lower (<5%). This begs the question of whether or not low GWP refrigerants will have any impact on the overall problem of climate change.

Consequently, the indirect impact of increased energy use to support those mobile air conditioning units on global warming is more significantly impacted by the fuel sources used to produce electricity. The U.S. production of electricity is fueled primarily by coal, followed by natural gas burning turbines. Combined with hydropower and nuclear energy, the electric power industry reportedly emits about 0.65 kg CO2/kWh. Of course, CO2 is the major offending greenhouse gas, so the higher demand for electric power for air conditioning results in a much higher saturation of CO2 into the atmosphere.

Compounding the above mentioned issues of higher production of greenhouse gases is the fact that as the global economy improves for developing nations with major population centers like India and China, the emerging middle-class are now installing air conditioners to achieve the same comforts that European and Western Countries have enjoyed for decades. Interior climate control has taxed the electrical capabilities for many of these nations who are now importing and mining for coal for power generation at record high amounts.

According to the Institute for Energy Research, (May 26, 2017), China is building over 100 coal powered power plants in Africa, and has increased its coal powered electrical consumption domestically to meet a demand for 1,100 gigawatts, which is three times the entire coal-fired capacity of the United States. Pakistan is building 12 more coal-fired plants over the next two years, and India is at various stages of building 139 coal-fired energy plants, increasing India's coal demand by 123%. These Tables do not reflect the enormous demand that the growing electric car and electric bike industry will place on the entire global electrical grid. It is speculated that alternative sources of fuel may not be able to keep pace with the rising demand.

It has been found that in the United States, about 20% of the electrical energy we use goes to air conditioning. One consideration for addressing the reduction of the costs of energy, both from an economic standpoint, but also from the environmental cost would be to simply develop a non-flammable refrigerant that is low in GWP, while substantially reducing the energy consumption of most standard air conditioner and refrigeration units in existence today.

Therefore, the new standard of Total Environmental Warming Impact (TEWI), is quickly becoming the most critical criterion in choosing the next generation of refrigerants. Direct Global Warming Potential (GWP) escapes most of the impact of some refrigerant choices because many of the low GWP refrigerants have diminished capacity, do not keep the area cool, and run constantly trying to keep up with an ever-warming world. It is somewhat of a paradox that by trying to live in a cooler environment, we have created a warmer climate, increasing dependence on refrigerants to keep us cool, and thereby exacerbate the problem of greater energy demand, resulting in greater global warming. If requiring a low-GWP system leads to an inefficient system with much higher TEWI (and thus more climate impact), this would-be counter-productive for meeting warming reduction targets as efficiency standards increase. This may be an unintended consequence not be a good engineering trade-off.

This Background description includes information that may be useful in understanding the present invention. It is not an admission that any of the information provided herein is prior art or relevant to the presently claimed invention, or that any publication specifically or implicitly referenced is prior art.

SUMMARY OF THE INVENTION

A first aspect of the invention discloses a reverse micellar configuration of a new and non-obvious inventive subject matter regarding heat transfer fluids, especially including a coordination entity composition comprising a heat transfer fluid, such as a hydrofluorocarbon, complexed with at least one organic oil fatty acid, preferably selected from the group consisting of food grade walnut, almond, canola and safflower oil. As used herein, the term "organic oil fatty acid" can include a fatty acid of an organic oil or a fatty acid of an organic oil blend. Preferably, the heat transfer fluid is complexed with at least some of the organic oil fatty acid through Van der Waals forces, upon activation of the fatty acid under heat and pressure in a closed vessel, preferably having a copper construction.

In a second aspect of the present invention, said heat transfer fluid can be complexed with at least 1, 5, or even 10 or more % of a blend of a first, second and even third organic oil of a food grade oil composition. This complexing can exist between heat transfer fluid molecules and fatty acids of the oil blend via a non-covalent bond, either through hydrogen bonding or Van der Waals forces. In some aspects, the fatty acid molecules of an oil blend are activated in a closed vessel under heat and pressure and then subsequently subjected to the heat transfer fluid under heating conditions from 120° F. to over 200° F. in a closed vessel, preferably made of copper, under pressure. In some aspects, the composition made by this complexing can comprise approximately 95-99 weight percent (wt %) of the polar heat transfer fluid, and approximately 1-5 wt % of the oil blend. Thus, the composition can comprise a polar heat transfer fluid to oil blend ratio of 1:99 or 5:95, or any ratio in between. Moreover, all commercially suitable ratios of polar heat transfer fluid to oil blend is contemplated, including for example: 0.1:99.9; 10:90; 25:75; 50:50; 75:25; or 99:1, among others.

It should be appreciated that the oil complexes contemplated herein include food and other natural oils, as well as synthetic oils.

As used herein the term "fatty acid" refers to a substituted or non-substituted, saturated or unsaturated, carboxylic acid with a long aliphatic tail (chain) having from 10 to 20 carbons in the aliphatic chain. This would include, for example, a fatty acid ester, a fatty acid having no double bonds, and a fatty acid having multiple double bonds. As used herein a simple fatty acid is a non-substituted, saturated or unsaturated fatty acid. Oleic acid and linoleic acid are examples of simple fatty acids. It is contemplated that the inventive concepts herein, including those embodied in the originally filed claims, could apply to the more general type of fatty acid, and to simple fatty acids.

In some aspects of the inventive subject matter, compositions at least 0.1 wt %, 1 wt %, 2 wt %, at least 3 wt %, at least 4 wt %, at least 5 wt %, at least 10 wt %, at least 15 wt %, at least 20 wt %, at least 50 wt %, or at least 95 wt % of the heat transfer fluid therein is complexed with an organic oil fatty acid. A heat transfer fluid can be complexed with at least 1%, at least 5%, at least 10%, at least 25%, at least 50%, or at least 80% of the fatty acid composing the composition.

Each of the organic oils or the oil blend as a whole can compose at least 0.1 wt %, at least 1 wt %, at least 2.5 wt %, at least 5 wt %, at least 10 wt %, at least 15 wt %, at least 20 wt %, at least 25 wt %, at least 50 wt %, or at least 95 wt % or more of the composition. A heat transfer fluid can be complexed with at least 1%, at least 5%, at least 10%, at least 25%, at least 50%, or at least 80% of the organic oil(s) composing the composition.

A preferred aspect of the present invention includes an activated blend of equal portions of walnut, almond and canola oils that is then heated in the presence of 1,1,1,2 tetrafluoroethane in a pressurized vessel made of copper and other transition metals at temperatures of from 120° F. to over 200° F., yielding a reverse micellar configuration.

Also in some aspects, a first fatty acid (e.g., linoleic acid or oleic acid, etc.) can compose at least 0.1 wt %, at least 1 wt %, at least 2.5 wt %, at least 5 wt %, at least 10 wt %, at least 15 wt %, at least 20 wt %, or at least 25 wt % of the composition. In less preferred aspects, the first fatty acid can compose less than 0.1 wt % of the composition.

Contemplated compositions can comprise two or more different organic oils, and each organic oil can comprise one or more fatty acids having one, two, three, or even more carbon-to-carbon double bonds. In some aspects, the fatty acid(s) compose at least one food oil of an oil blend, including for example, walnut, canola, sunflower or almond oil.

The heat transfer fluid can comprise any commercially suitable heat transfer fluid, but is preferably a hydrofluorocarbon, and even more preferably a halo-ethane such as 1,1,1,2 tetrafluoroethane.

At least one of the organic oil(s), the fatty acid(s) and the polar heat transfer fluid can be activated in any suitable apparatus, including for example, a tube or pipe or closed vessel apparatus comprising at least one of a copper, nickel, palladium, zinc, platinum, rhodium, iridium, or an alloy thereof, or a copper mesh, a steel mesh, or Nylon scrub pads. It is also contemplated that the activation can occur under heat and pressure. As used herein, the term "under heat and pressure" means at least 15° C., and at least 1.25 atmosphere (atm). Other contemplated heating temperatures include at least any of 20° C., 30° C., 50° C., 100° C., 150° C., or even 200° C. or more. Other contemplated pressures include at least any of 1.5 atm, 5 atm, 10 atm, 25 atm, 100 atm, or even 150 or more atm. Where an oil blend is activated (e.g., in a closed vessel having a catalyst), it is contemplated that the oil blend can be a composition of the inventive subject matter, even without the addition of a polar heat transfer fluid.

In one aspect, a small amount of polar heat transfer fluid can be added before or during activation of an oil blend. It is also contemplated that a small amount of polar heat transfer fluid can be added shortly after activation (e.g., within one hour, within two hours, etc.). Still further, the activated oil blend and small amount of polar heat transfer fluid can then be injected into a large quantity of the polar heat transfer fluid for further complexing.

It is contemplated that a composition of the inventive subject matter can have a superior compressibility factor than existing refrigerants and refrigerant compositions.

In some aspects of the inventive subject matter, 0.1 to 95 wt % of 1,1,1,2-tetrafluoroethane (also known as R-134a) is mixed with 27 to 99.9 wt % of one or more organic oil(s), and at least 0.1% of the R-134a is complexed with some of the organic oil(s) via Van der Waals forces (e.g., the R-134a interacts with a hydrogen of a carbonyl group of a fatty acid of the organic oil, or a carbon-to-carbon double bond of the organic oil). Without wishing to be limited to any particular theory or mechanism of action, it is contemplated that an absorptive process can occur wherein the R-134a is complexed to the fatty acid(s) of the organic oil(s) via a Van der Waals force attraction to the carbon-to-carbon double bonds, and that such complexing can tend to inhibit oxidation or other deterioration of the fatty acid.

The double carbon bond is a relatively stable zone, where the atoms on either side generally do not spin as rapidly about as with comparable singly bonded carbons. This is borne out in experimental data, where the complexing of an R-134a molecule with a double carbon bond of a fatty acid can create a unique signature that is detectable with H-NMR and x-ray diffraction. While not wishing to be limited by any particular mechanism of action or theory of operation, in this or other recitations of theory herein, it appears that some type of significant complexing is taking place when the activated oil blend is dissolved in R-134a.

In some aspects, the R-134a can be mixed with 27 to 99.9 wt % of at least two different organic oils. It is contemplated that the first and second organic oils can be activated in a tubing apparatus under a heat of 15 to 200 or more ° C. and a pressure of 1 to 150 or more atm for a period of time between one minute and twenty-four or more hours. This activation can occur prior to mixing and/or complexing with the R-134a, or can occur with R-134a already mixed with the first and second organic oils (e.g., the oils and at least some of the R-134a can be activated and complexed within the apparatus). It is also contemplated that the oils can be activated first, and mixed/complexed with R-134a at a later time (ranging from immediately after activation to days, months, or even years later).

Various objects, features, aspects and advantages of the inventive subject matter will become more apparent from the following detailed description of preferred aspects, along with the accompanying drawing FIG.'s in which like numerals represent like components.

BRIEF DESCRIPTION OF THE DRAWINGS

FIG. 2C is a top perspective view of a R-134a molecule complexed with a fatty acid molecule (oleic acid);

FIG. 3 is a schematic of an R-134a molecule; and

DETAILED DESCRIPTION OF THE INVENTION

Figure 1:
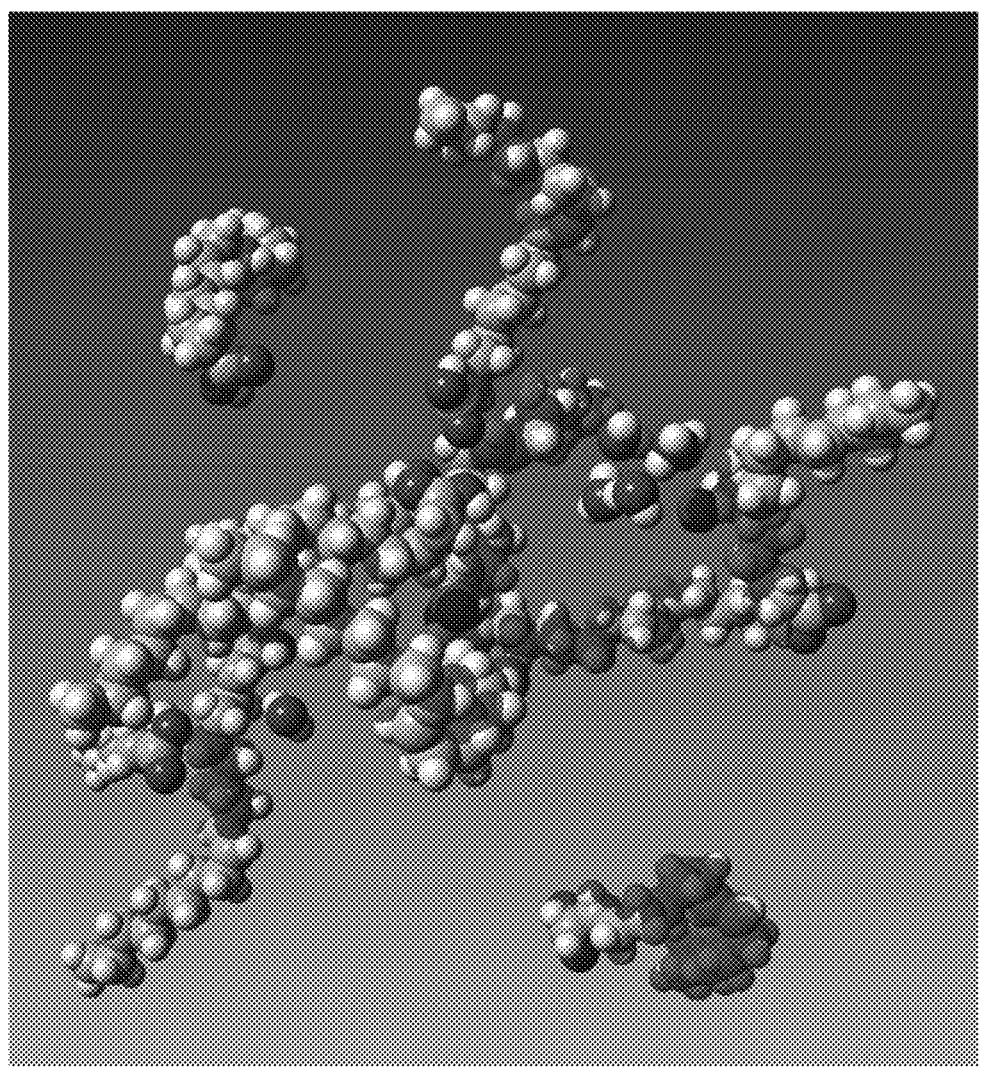
FIG. 1 is a schematic illustrating the reverse micellar configuration of a coordination entity of the present invention subject matter.

The following discussion provides many example aspects of the inventive subject matter. Although each aspect represents a single combination of inventive elements, the inventive subject matter is considered to include all possible combinations of the disclosed elements. Thus if one aspect comprises elements A, B, and C, and a second aspect comprises elements B and D, then the inventive subject matter is also considered to include other remaining combinations of A, B, C, or D, even if not explicitly disclosed.

It should be noted that while the below description sometimes focuses on an oil blend, wherein the oil blend is injected into a large quantity of R-134a, the inventive subject matter should be interpreted to include other combinations of haloalkane complexes comprising a heat transfer fluid and a fatty acid.

A composition of the inventive subject matter could be made by blending a first, second and third fatty acids and processing the blend under heat and pressure, in a processing apparatus having a controlled environment, to form an activated blend of organic oils.

The controlled environment under which one or more of the fatty acids are processed can include, among other things, predetermined materials, temperatures, pressures, or times. One example of a predetermined material can comprise material that the processing apparatus composes (e.g., copper, iron, steel, wood, plastic, etc.) or a catalyst inserted into the processing apparatus. A predetermined temperature or pressure can be the temperature/pressure or range of temperatures/pressures that the organic oil(s) or fatty acid(s) are exposed to during processing. A predetermined time can be the length of time the organic oil(s) or fatty acid(s) are processed, the length of time the organic oil(s) or fatty acid(s) are processed under a given temperature, the length of time the organic oil(s) or fatty acid(s) are processed under a given pressure, and so forth.

Examples of fatty acids include for example, oleic acid, linoleic acid, linolenic acid, myristoleic acid, palmitoleic acid, sapienic acid, elaidic acid, vaccenic acid, arachidonic acid, eicosapentaenoic acid, erucic acid, docosahexaenoic acid, and palmitic acid, linolaidic acid, and α-linolenic acid.

In some aspects, unsaturated fatty acids are preferred. Each acid can be derived from any suitable source, including for example, an organic oil (e.g., a plant oil, food oil, etc.). As used herein, an "organic oil" is any oil produced by plants, animals, and other organisms through natural metabolic processes other than crude oil or petroleum-based oils. Contemplated food oils include walnut oil, almond oil, canola oil, beech nut oil, coconut oil, cottonseed oil, olive oil, palm oil, peanut oil, safflower oil, sesame oil, soybean oil, sunflower oil, cashew oil, hazelnut oil, macadamia oil, pecan oil, pine nut oil, pistachio oil, grapefruit seed oil, lemon oil, orange oil, pumpkin seed oil, watermelon seed oil, or any other suitable food based oil. In is contemplated that a composition having only a single type of fatty acid (or predominantly a single type of fatty acid) can comprise a higher or lower wt % of the fatty acid (or the organic oil(s) comprising the fatty acid) depending on the type used. For example, a composition having only (or predominantly) oleic acid can have less than, twice as many, or even three times or more fatty acids than a composition having only (or predominantly) linoleic acid, or some other acid.

It should also be noted that it may be possible to manufacture a wide variety of synthetic oils that can be activated and complexed with a polar heat transfer agent. Such oils could have an odd number of carbons, an even number of carbons, no double carbon bonds, two or more double bonds, etc.

Once the fatty acid (or oil comprising the fatty acid) is processed and activated, the activated blend can be infused, injected into, or otherwise combined with first heat transfer fluid 150 to produce composition comprising a haloalkane complex having a non-covalent hydrogen bond or Van der Waals interactions. As discussed above, a small amount of the heat transfer fluid could have been mixed with the fatty acids in the processing apparatus, and complexed therein upon activation of the fatty acids.

As used herein, the term "Van der Waals force" or "Van der Waals interaction" means the sum of the attractive or repulsive forces between molecules (or between parts of the same molecule), other than those due to covalent bonds, or the electrostatic interaction of ions with one another or with neutral molecules. It is true that some authorities use the term more narrowly to exclude hydrogen bonding, but as used herein the term includes hydrogen bonding, forces between two permanent dipoles (Keesom force), forces between a permanent dipole and a corresponding induced dipole (Debye force), and forces between two instantaneously induced dipoles (London dispersion force).

All commercially suitable heat transfer fluids are contemplated, including for example, methane-based (r-(000-099)) refrigerants, ethane-based (r-(100-199)) refrigerants, propane-based (r-(200-299)) refrigerants, cyclic organic (r-(300-399)) refrigerants, zeotropes (r-(400-499)), azeotropes (r-(500-599)), organic (r-(600-699)) refrigerants, inorganic (r-(700-709)) refrigerants, and unsaturated organic (r-(1000-1099)) refrigerants.

It is contemplated that a composition of the inventive subject matter can be used in an existing refrigeration system that is compatible with R-134a, r-410 or r-22, or some other refrigerants. However, some modifications, preferably minor, can be required (e.g., a small part change, addition, etc.). An inferior refrigerant can be completely removed from the system, and the system can be recharged with a composition of the inventive subject matter. Moreover, a composition of the inventive subject matter can be added to a system without complete removal of a prior refrigerant from the system. This is due to the fact that the compositions appears to be more energy efficient and self-sealing than existing refrigerants, even when combined with one or more contaminants (e.g., an inferior refrigerant or refrigerant composition, such as R-134a, R-410, R-22, etc.).

Moreover, a composition of the inventive subject matter could be used in a novel unit comprising a different ratio of compressor size to coil size. For example, as compared to an existing refrigeration unit having a compressor size to coil size ratio of X:Y, a new unit can have a ratio of X−Z:Y, X+Z:Y, X:Y−W, or X:Y+W, wherein Z is at least 10%, 20%, 30%, 50%, or even 75% or more of X, and wherein W is at least 10%, 20%, 30%, 50%, or even 75% or more of Y. As another example, a new unit can have a greater number of, or a different configuration of, coils.

One possible composition of the inventive subject matter is the novel refrigerant fluid comprising a mixture of approximately 95-99 wt % of 1, 1, 1, 2-Tetrafluoroethane (i.e., R-134a) at least partially complexed with approximately 1-5 wt % of a non-toxic oil blend comprising one or more organic oils, wherein the oil blend has an oleic acid to linoleic acid ratio of between 70:30 and 50:50, and preferably approximately 60:40 wt %. The organic oils can include one or more of a canola oil, a walnut oil, an almond oil, and a sunflower oil, among others. One contemplated blend comprises walnut, almond and canola oils ("CAW blend"). Another contemplated blend comprises canola and sunflower oil ("CS blend"), preferably at an approximate ratio of between 5:1 and 2:1 (e.g., 3:1). Yet another contemplated blend comprises walnut, almond and canola oils, and a small amount of R-134a.

FIG. 1 illustrates a proposed reverse micellar configuration of the composition of the present invention, wherein a coordination entity is shown with a refrigerant solvent with a fatty acid solute. Both charged and uncharged fatty acids may be employed with or without a copper or other transition metal ion for composition stability may be included. Such charged states of a lipid carboxylate find more or less stability, depending on the transition metal ion employed.

Figure 2A:
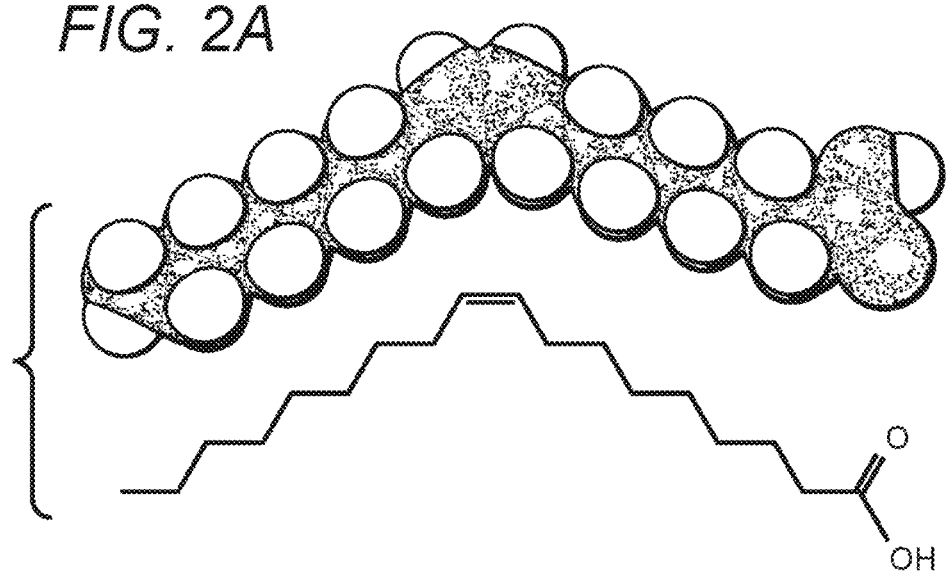
FIG. 2A shows the chemical structure of a fatty acid molecule (oleic acid)
Figure 2B:
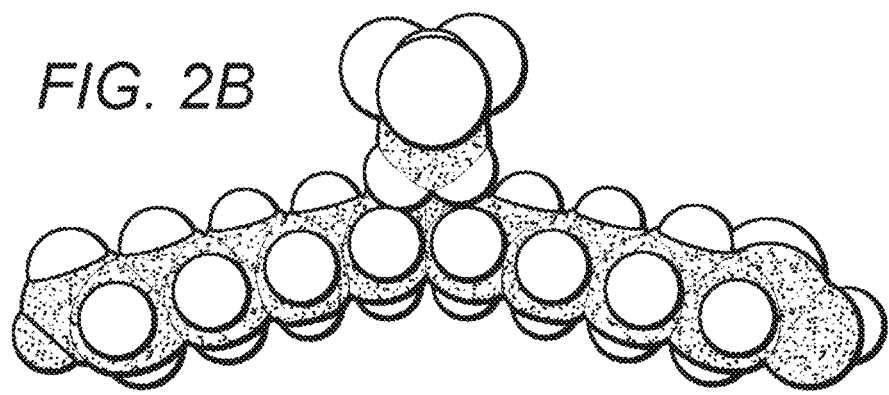
FIG. 2B is a front perspective view of a R-134a molecule complexed with an fatty acid molecule (oleic acid)

A perspective view of a fatty acid molecule composing a preferred oil blend of the inventive subject matter (e.g., oil blend) is shown in FIG. 2A. Proposed perspective views of a R-134a molecule complexed with a fatty acid molecule is shown in FIGS. 2B-2C.

It appears that the complexing occurs in two steps. The first step occurs when the two positively charged hydrogen atoms of R-134 interact in a non-covalent fashion via hydrogen bonding or via Van der Waals with an exposed negatively charged double carbon bond, to form a shared triad/quad. This is a relatively weak form of non-covalent bonding interaction and relies on surface reaction chemistry to form. This relatively weak interaction could explain an observed effervescence.

A second stage bonding apparently occurs when the extremely negatively charged fluoride attached to the same carbon of the R-134a with the two hydrogens, then bonds to the two positively charged hydrogen atoms which are attached to the two carbons of the double carbon bond. A synergistic effect of the two oppositely charged/aligned triads can have an overall strengthening effect and could lock in this multi-interaction.

As the presence of R-134a bound to the oils increases, the viscosity can also increase. As discussed above, any commercially suitable refrigerant(s) can be infused with any suitable oil or oil blend comprising a fatty acid to produce a composition of the inventive subject matter. Thus, the activated oils and specific complexes discussed in detail herein are only some of the possible compositions of the inventive subject matter.

On the other hand, R-134a has been shown experimentally to provide the most significant improvement in refrigeration efficiency when mixed with the oils of a oil blend, possibly due to its highly polar nature as compared with other refrigerants. In particular, a mixture comprising approximately 95-99 wt % of R-134a and approximately 1-5 wt % of the oil blend (which can also include approximately 50% of an oleic acid and 33% of a linoleic acid) was found to be very efficient.

The oils of one possible blend comprising walnut oil, almond oil, and canola oil, the CAW blend, are quite similar in chemical composition, as shown in Tables 1A-B (below). The Oleic acid accounts for approximately 50% of the "fatty acids" in the blend (comprising precursor/feedstock oils) and are an Alkene with an 18 long carbon chain. Oleic acid has one double carbon bond. Linoleic acid accounts for around 34% of the fatty acids in the blend and is also 18 carbons long, with two double carbon bonds. Linolenic acid is around 9% of the fatty acids in the blend and is 18 carbons long, with three double carbon bonds. Palmitic acid is around 5% of the fatty acids in the blend and is 16 carbons long.

| Feedstock Oil Ratios | | | |
| --- | --- | --- | --- |
| | Walnut Oil | Almond Oil | Canola Oil |
| Oleic Acid | 28% | 69% | 61% |
| Linoleic Acid | 51% | 17% | 21% |
| Linolenic Acid | 5% | | 9% |
| Palmic Acid | 11% | 7% | 4% |

| Blend for B1 | | | |
| --- | --- | --- | --- |
| | Total | Weighted by Bonding Sites | Carbon # | Carbon Type |
| Oleic Acid | 49.30% | 34.50% | 18C | Alkene |
| Linoleic Acid | 33.30% | 45.00% | 18C | Alkene |
| Linolenic Acid | 8.67% | 18.30% | 18C | Alkene |
| Palmic Acid | 5.30% | 0.00% | 16C | Alkane |

These food oils predominantly consist of relatively long-chain carbon molecules or fatty acids bonded to a glycerol. Fatty acids in free form have a carboxyl group (COOH) at the first (Alpha) carbon on the carbon chain, making them carboxylic acids. In plants, most fatty acids are bonded in triplets to a glycerol molecule to form a triglyceride. A triglyceride can have different types of oils in various arrangements attached to it. Oleic fatty acids in some plants tend to be mostly bonded in di-glycerides, especially those derived from rapeseed oil (Canola Oil). Mono-glycerides are only present in significant amounts in a few plants, such as peanuts. In common practice, the tri, di or mono-glycerides are ignored and only the fatty acid or "oil" content is listed. This is due to the glyceride fatty acid bond being esterified before most kinds of chemical testing, allowing for the various fractions of fatty acids to be accurately measured.

One important discovery from an H-NMR application was the presence of a coordination entity of R-134a to the oils (e.g., of the oil blends) by inter-molecular hydrogen bonding and/or Van der Waals forces. The chemical complexing of the R-134a to the oils leaves a detectable signature, and is relatively stable and remains intact even after days in a depressurized state. Surprisingly, the amount of tightly complexed R-134a to the oils apparently increased over time when used in an air conditioning system, thereby inhibiting degradation of the oils.

A catalyst can be used to cause a reaction between the R-134a and a fatty acid. When R-134a is bubbled intensively through the oil, it is possible that no reaction occurs, even at 300 degrees F. and over long periods of time. This is likely due to the rapid spinning along the axis of the carbon to carbon single bonds on both the R-134a and fatty acid molecules. In the liquid oil, the singly bonded carbons can spin relative to each other many thousands of times a second. In the R-134a gas, the relative spin rate can be magnitudes faster, and it is likely that the two molecules simply bounce off each other. The coordination entity may be formed in the presence of a copper, nylon or stainless steel catalyst. Especially useful is a copper wool or a copper closed vessel, whereby the copper vessel may act as a catalyst.

When a catalyst is present above a sparge in the reaction chamber, a rapid reaction can occur, even at room temperature. Pressure in the reaction chamber rapidly drops while temperature rises, thereby evidencing an exothermic reaction. The type of chemistry occurring includes surface reaction chemistry. When inert gasses such as Nitrogen were run through the chamber with the catalysts, no reaction was observed.

When a fatty acid is at least partially immobilized on copper or other activation surface through hydrogen bonding or Van der Waals forces, the carbon to carbon single bond spinning is vastly reduced. This reduction is also true for the R-134a when it reacts with the surface. This allows the Keeson and Debye forces to predominate, and either hydrogen bonding or Van der Waals absorption of the R-134a onto the oil occurs. This reaction occurs in an extremely short interval of time, before the product is swept off the surface into the mass of the oil blend. The source of heat observed during the reaction is likely from the heat released due to the phase change of the R-134a from a gas to a liquid.

In opening the reactor chamber and passing a copper mesh through the freshly absorbed complexes, effervescence can be observed. However, this phenomenon goes away over time without evidence of degassing into the reactor chamber. It appears that the initial absorption Van der Waals interaction/complexing changes to a different stronger Van der Waals complexing over time. This was evidenced by a strong R-134a signature that was weeks old and suspending over boiling water in test tubes for hours. Nor was a weakening of the R-134a signature observed when exposed to the atmosphere over a long period. No significant degassing was observed after approximately two weeks.

Over time the signature of the R-134a in the oil measurably increased when used in an air conditioning unit. The signature appears to increase along with the repeated mixing of the oil and R-134a through normal machine operations. A noticeable increase in viscosity and change in color can also occur with an increasing R-134a signature. An end of R-134a that sticks out can apparently form ever shifting double hydrogen bonds with the numerous hydrogen atoms of other oil molecules, which increases viscosity. The complexing apparently does not remove or replace any atoms on either the R-134a or fatty acid molecules, as the signatures of both molecules remained.

In some testing, prior to use in a refrigeration system, the present invention shows a slight presence of two quartets at 4.7 and 4.58 in the H-NMR, indicating R-134a bonding. The present refrigerant that was used for 120 days showed much more pronounced quartets at these sites. This shows more R-134a is binding to the oils over time, indicating growing even better with use, at least up to a certain point.

The molecular hydrogen bonding or Van der Waals behavior of these new haloalkanes also has been shown to change over time. The haloalkane recovered from unused samples is a clear yellow viscous liquid. This clear yellow color indicates whatever bonded water existed in the CAW blend, has been expunged. The liquid is also more viscous than the CAW, flowing at a noticeably slower rate. The blue-green color of the 120 day used sample, indicates that as more R-134a binds to the oils, intra-molecular (resonant frequencies) rise, along with viscosity. In testing of the fresh sample, the oil was very hydrophobic and would not mix with any amount of water.

A composition of the inventive subject matter can produce the same amount of heating or cooling in a system using less than 90%, less than 75%, less than 50%, or even less than 33% of conventional refrigerants (e.g., R-134a, r-410, r-22, etc.). For example, sensor arrays and data streams recorded show that the sample can produce the same amount of cooling in a system for somewhere between 35% and 60% of the wattage compared to some conventional refrigerants. A composition of the inventive subject matter can also keep a space colder or hotter for longer periods of time than conventional refrigerants. For example, it has been found that the present invention can keep a space colder or hotter for longer periods of time than existing refrigerants or refrigerant compositions. Thus, a system utilizing the present invention or other composition of the inventive subject matter can provide the same cooling or heating as a system utilizing r-410, while running for approximately 10-30 minutes less per hour. Moreover, compositions of the inventive subject matter charged refrigeration units and systems can produce significantly less condensation off evaporate coils. For example, over an eight hour test run of two air conditioning systems, an r-410a charged system had an evaporator coil temperature of 55.2 degrees F. and condensate of 5.75 gallons, while a system charged with the present invention had an evaporator coil temperature of 51.4 degrees F. and condensate of 1 gallon. This phenomenon of reduced condensation was observed in each air conditioning system charged with the present invention.

R-134a is unique among the fluorocarbon refrigerants, in that it is also used as a solvent in the pharmaceutical industry. This solvent ability is due to the polar nature of its molecule as shown in FIG. 3. One side of the molecule has the negatively charged fluoride atoms, while the other side has the positively charged hydrogen. The polar nature of water also makes it an excellent solvent.

It should also be noted that hydrogen bonding, Debye or other Van der Waals can be quite strong between or among long chain oils (triglycerides). This attraction is why these oils are liquid over such a wide range of temperatures and have such a high vaporization point (boiling point). These characteristics are useful for frying and evidently refrigeration.

Figure 4:
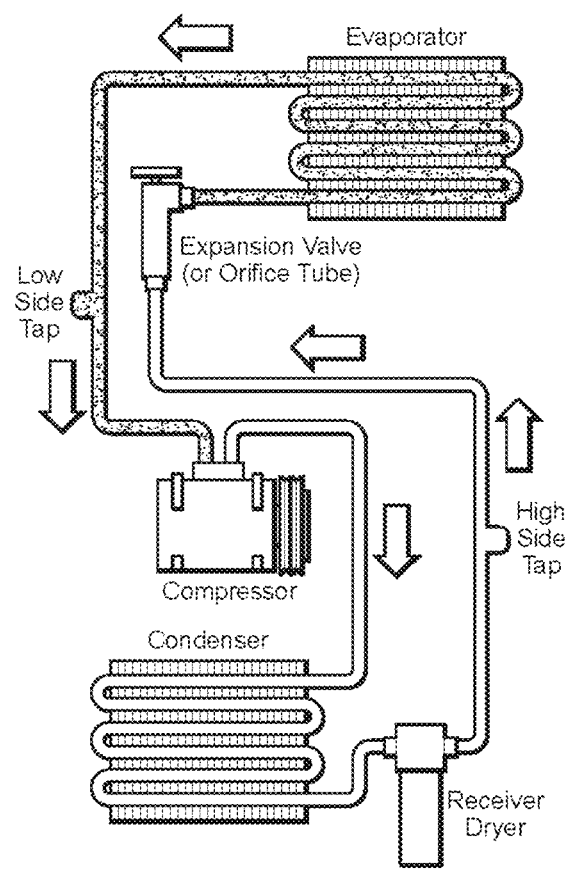
FIG. 4 is a schematic of a typical refrigeration cycle.

As shown in FIG. 4, air conditioning systems generally utilize a refrigerant cycle having two main parts, the condenser cycle and the evaporator cycle. The following description is for a standard air conditioner system. The condenser cycle starts at the compressor, where the warmed gas from the evaporator cycle is compressed back into a semi-liquid. This semi-liquid is then pumped through condenser coils, where a fan removes the heat into the outer environment and the gas becomes fully liquefied. This liquefied cooled fluid then flows to the expansion valve, where it changes from a liquid into a gas and adiabatically cools. This cooled gas then flows into the evaporator coils, were a fan blows cooled air into the controlled environment and the gas is warmed.

Increased pumping efficiency in the compressor, is likely the most significant cause of the increased efficiencies and other compositions of the inventive subject matter. One reason for this increased efficiency is the highly viscous characteristics of the oil blends of the inventive subject matter (e.g., CAW, CS, etc.). The oil blends can increase the sealing around the piston in a reciprocal pump, the spinning blades in a centrifugal pump or internals of a scroll pump, over commonly used mineral oils. Another minor reason, is it takes less energy to pump an incompressible liquid, than it takes to pump a compressible gas. The oil blend is always or almost always going to be liquid, as the temperature of the oils will never come remotely close to their vaporization points. Some atomization likely occurs at the expansion valve, but will quickly re-liquefy onto the internal surface of the evaporator. The R-134a is driven into a liquid at the compressor and also likely dissolves more rapidly into the oil blend, than a mineral oil. At this higher pressure, hydrogen bonding or Van der Waals forces would likely complex the R-134a to the oils, in much the same manner the oils are bonded to each other in a liquid state.

After leaving the condenser, the cooled liquid reaches the expansion value and the R-134a can begin its transition into a gas. The phase transition can be driven to completion in the evaporator coils. This is also likely where a secondary cause of increased efficiencies of compositions of the inventive subject matter is found. It is a unique physical process likely dependent on R-134a's polar interaction with the structure of the particular oils. Some preparatory discussion is necessary to delve into this unique process.

Polarity, solvent ability and heat capacity in molecules are closely related. Due to the unique structure of R-134a and the C═C/C═O binding sites on the mixed oils, as well as Van der Waals dispersion forces, a sharing of heat capacity occurs during the fully liquid phase. In some preferred oil mixtures, the ratio of oleic acid to linoleic acid is approximately 3:2. These two acids have quite different heat capacities despite their close chemical structure of 18 carbon units. This is due to the number of double (C═C) carbon bonds. Oleic acid has a heat capacity of 2.88 kJ/(kg·K) (kilojoules perKilogramsK), to linoleic acid's heat capacity of 0.37 kJ/(kg·K). R-134a is only two carbon units long and its heat capacity is 1.34 kJ/(kg·K). Although smaller than Oleic acid, the key to R-134's usefulness is its heat of vaporization at approximately −15.3° F. (boiling point) at atmospheric pressure. It can transform from a liquid to a gas phase around the temperatures useful for cooling, allowing it to efficiently shed heat. This is a key to any good refrigerant. The fatty acid oils cannot do this, due to their extremely high heat of vaporization. Linolenic acid has the lowest heat of vaporization at 450° F.

On the other hand, these organic oil fatty acids can generally have melting points around the temperatures that air conditioning unit evaporators operate. Oleic acid has a melting point of approximately 55° F., while that of linoleic acid is approximately 23° F. and linolenic acid is at approximately 12° F. For R-134a, the relevant value is heat of vaporization at approximately −15.3° F. The expansion valves on standard air conditioner units are adjusted to take the evaporator toward the freezing point of water, but not so cold that ice forms on the outer surface of the evaporator. Therefore, the R-134a is not going to reach its full potential cooling, but will vaporize above the melting points of the high acid oils. The oils are generally almost always or always going to be liquid, although some atomization likely occurs at the expansion valve.

Another reason for the significant increase in refrigerant efficiency can be attributed to surface binding, and other compositions of the inventive subject matter, to the metal of the refrigerant system. This is evident from the fact that when a unit was switched from the present invention to r-410a, there was a temporary improvement in efficiency, most likely due to the present haloalkane complexes closely binding to the internal surfaces of the cooling system, until it was removed by the various constituents of r-410a. A smaller amount of efficiency is also gained by this lubrication effect, due to the smoother flow of gas and oils through the system.

This surface binding feature is also apparently responsible for the observed reduced refrigerant composition leakage from the air conditioning units. Most air conditioning system components were designed to use the larger Freon 113 ($C_2Cl_3F_3$), until it was banned due to it possibly damaging the ozone layer. The significant leakage problems with R-410a or R-134a are due to their smaller molecular geometry than the Freon 113 they were designed to replace. The fluorine atoms of R-410a and R-134a are much smaller than the chlorine atoms of Freon 113. Air conditioning systems charged with r-410a typically leak around 20% of the coolant into the atmosphere annually, R-134a has a slightly lower leakage rate. This is why car air conditioners, almost exclusively use R-134a, and need to be recharged every few years. However, the leakage rate of R-134a is still significantly higher than the leakage rate of the present invention and other compositions of the inventive subject matter.

The likely physical process by which this leakage is reduced, is through the larger haloalkane complexes efficiently filling any small fissures between the seals. Thus, the present invention substantially seals the system utilizing it, and reduces the need to recharge the system. Moreover, a system can be charged with approximately 50% less refrigerant (or other compositions of the inventive subject matter) than the installed refrigerant, such as R-22 or R-410a. The oils would stick to the rubber and metals with even stronger Van der Waals interactions then they stick to each other. As these oil molecules are held together by significant Van der Waals forces, they would greatly reduce the passage of any of the present invention refrigerant out of the air conditioning system. This high Van der Waals complexing potential is not applicable to the usual mineral oil lubricants used in standard R-22, R-410a or R-134a system.

Another more important factor is the increase in operating efficiencies of the air conditioning unit. The Indirect Emissions of automobile air conditioning units are around 60% of the total TEWI in temperate regions and much more in the tropics. We know from testing, around 35% to 60% the wattage is needed to run an air conditioning system on the present invention. This would shave another 20% to 30+% off the TEWI. There is not much that can be done about the Transportation Effect of the TEWI. In total, around 55% to 65+% of TEWI could be shaved off the standard R-134a automobile air conditioning system, if they were converted to the present invention or another composition of the inventive subject matter. This would reduce the TEWI of a system below that of a $CO_2$ air conditioning system in most parts of the planet.

The amount of energy taken up by turning water vapor in the atmosphere into a liquid (enthalpy of condensation) is rather large, approximately 2.27 million J/kg (joules per kilogram). It is more than ten times more enthalpy than any refrigerant used inside a system. There is a large energy drain as moisture or ice reduces air interaction with the coils of a refrigeration system, making them even less efficient at removing heat from the air. A significant benefit of compositions of the inventive subject matter is that it produces less than ⅓ of the condensation that standard air conditioning systems produce, thereby increasing a refrigeration system's efficiency and cooling efficacy.

It is contemplated that the ratio of one fatty acid to one heat transfer fluid can comprise any suitable ratio, including for example, 1:1000, 1:100, 1:10, 1:5 or even 100:1 or more. It is also contemplated that the ratio of one food oil (from which at least one fatty acid is derived) to another food oil, of a mixture (non-activated) or activated blend, can comprise any suitable ratio including for example, 1:1, 1:2, 1:3, 1:4, or even 1:100 or less. In some aspects, a chemical marker can also be included.

Example 1

The present invention is a proprietary refrigerant developed and marketed to replace R-22 in air conditioning and refrigeration applications. It is intended to reduce compressor energy use while providing a comparable cooling effect.

To demonstrate the efficiency of this refrigerant in typical applications, CSES converted an existing Carrier 48TFF012 air-cooled direct-expansion 10 ton air-conditioning unit from R-22 to the present invention refrigerant at the W Hotel in Chicago, Ill. Prior to conversion, data loggers were installed to measure the compressor energy use and cooling delivered for a period of 26 days (Aug. 28, 2015-Sep. 23, 2015) to establish a performance baseline. After conversion, data logging was conducted for an additional 15 days (Sep. 24, 2015-Oct. 9, 2015). So far as is known, no other modifications were made to the system.

Preliminary results indicate that compressor power is reduced by an average of 20% (17%-24%) across the operating range of the air conditioner. The greatest reductions occurred when outdoor air temperatures were highest. Offsetting the energy reduction was a slight decrease in delivered cooling as evidenced by marginally higher supply air temperatures. Interestingly, this performance differential appears to decrease at higher outdoor temperatures suggesting that comfort would not be compromised on hot days. No changes in dehumidification capabilities were observed under any operating condition. Overall, the ratio of energy input to delivered cooling decreases by 18% to 30% across a range of operating conditions leading to reduced operating costs.

Based on observed performance to date, the baseline energy use of this AC unit is 23,000 kWh and a cost of $1,650. Conversion to the present invention composition refrigerant reduced the energy use by nearly 7,000 kWh and operating cost by $490—an energy and cost savings of 30%. This result is an upper-limit estimate based on evaluation and models of observed behavior. Additional observations at summer ambient temperatures (80° F.-100° F.) would provide a more reliable energy & cost savings estimate.

Data Analysis Methods

A Carrier 48TFF012 direct-expansion air-cooled rooftop air conditioner was evaluated using both the original R-22 charge and after conversion to the present invention composition refrigerant. The unit evaluated has the following specifications:

| Make & Model | Carrier 48TFF012-601GA |
|---|---|
| Nominal capacity at ARI conditions | 10 tons (117,000 BTUh) |
| Design airflow | 4,000 CFM |
| Electrical input | 13 kW |
| Performance rating | 9.0 EER, 9.4 IPLV |
| Refrigerant | R-22: 7 lbs. 3 oz. circuit 1, 7 lbs. 13 oz. circuit 2 |
| Refrigerant control | AcutrolTM metering device (fixed orifice(s)) |

Portable data loggers were used to measure compressor current, air temperature, and relative humidity for a period of almost 4 weeks (Aug. 28, 2015-Sep. 23, 2015) in the baseline case followed by an additional two weeks (Sep. 24, 2015-Oct. 9, 2015) after the present invention composition replaced the R-22. Outside air temperature was concurrently measured and used to segregate all observations into outside air temperature bins.

Compressor current was measured using a current transducer and data logger in one-minute intervals. Fifteen one-minute observations were averaged to determine the average current during a 15-minute period. Voltage and power factor were not measured, so reported power is an estimate assuming 480 V and a power factor of 0.9.

Since this evaluation is seeking differences in operating power, the assumption of constant voltage and power factor should not impede their detection.

Outdoor air, mixed air, and supply air temperature and relative humidity were measured using portable data loggers set to record observations in 15-minute intervals. Temperature and relative humidity measurements were then used to calculate the enthalpy and absolute humidity of their respective points using a psychrometric function add-in for Microsoft Excel. Airflow was not measured but assumed to be constant. Again, no changes were made to the air side of the system, so changes in cooling capacity can still be detected reliably.

This particular air-conditioner has two compressors that are staged to meet cooling loads. Low cooling loads are satisfied by one compressor; higher loads with two operating compressors. Observations of compressor kW, delta enthalpy across the coil (delivered cooling), and outdoor air temperature were used to evaluate system performance. Observations were filtered to capture steady-state operation (one or both compressors operating for 15 minutes of a 15 minute interval). Outdoor air temperatures were used to segregate observations into 5° F. bins. (e.g. the 70° F. bin includes observations where air temperature ranges from 67.5° F. to 72.5° F.) Using this data, the performance of the HVAC unit was evaluated using the following metrics:

Compressor power (kW)
Sensible Cooling (Δ ° F.)
Total Cooling (Δ kBTUh)
Dehumidification (change in absolute humidity ΔW)
Specific Performance (kW/kBTUh)

From these metrics, the probable annual energy & cost savings were estimated.

Results

Figure 5:
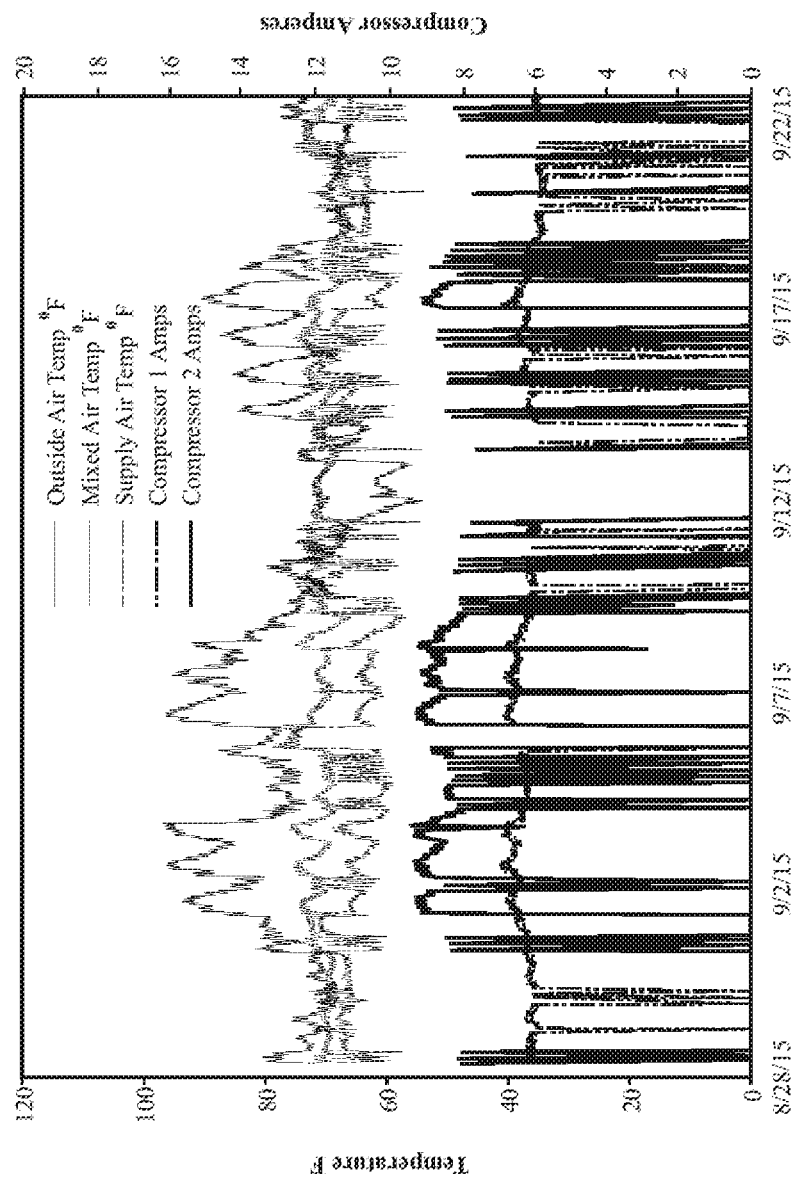
FIG. 5 is a temperature/amperage graph which illustrates the time-series data collected from the baseline case (R-22) from Aug. 28, 2015 through Sep. 22, 2015.

FIG. 5 illustrates the time-series data collected from the baseline case (R-22) from Aug. 28, 2015 through Sep. 22, 2015. Early September experienced several days above 90° F. and mid-September had days with highs in the 80s. Compressor 1 is seen to operate nearly continuously except for an extended period from September 11 through September 13 when temperatures were in the low 60s. Compressor 2 operated mostly when outdoor temperatures were above 80° F.

Figure 6:
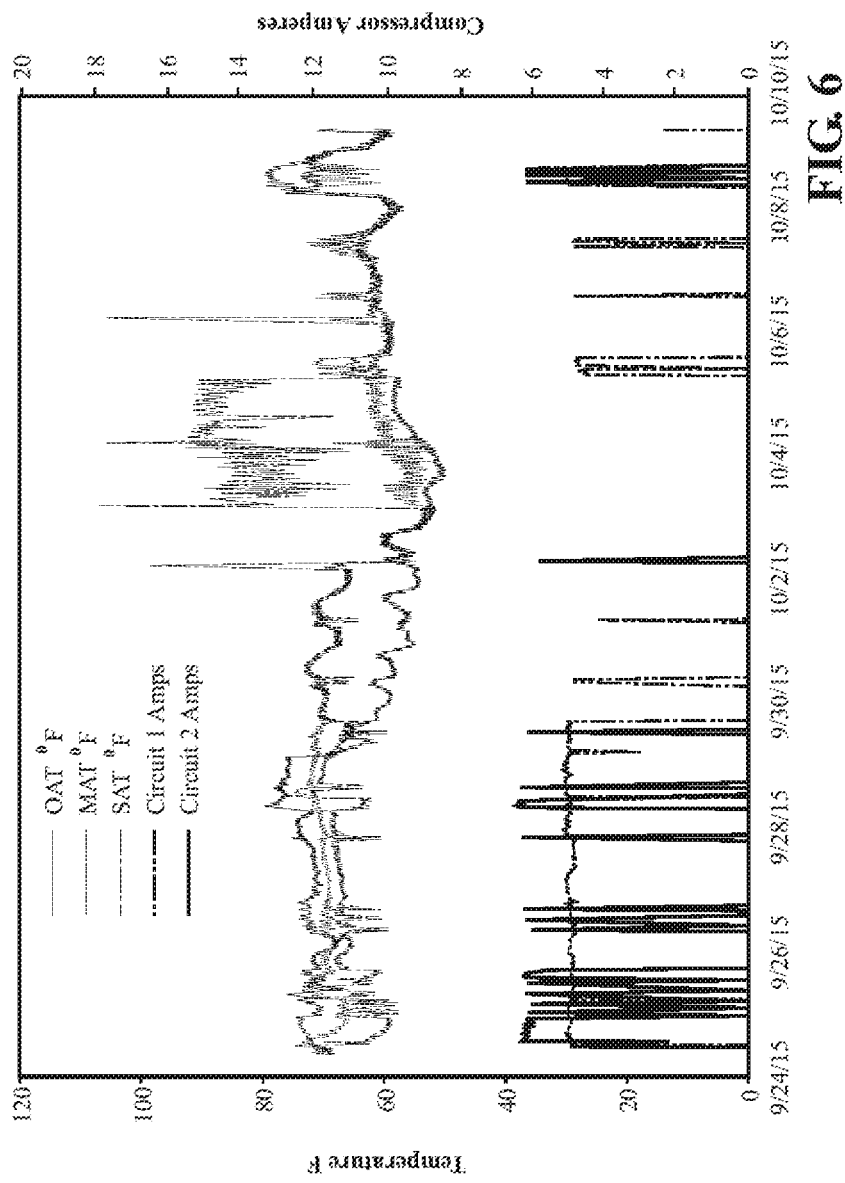
FIG. 6 is a temperature/amperage graph which illustrates the time-series data collected from the post-retrofit case Alltemp® from Sep. 24, 2015 to Oct. 10, 2015.

As illustrated in FIG. 6, following conversion to the present invention, the unit was observed for another two weeks from Sep. 24, 2015 to Oct. 9, 2015. During this time, outdoor temperatures fell and provided fewer operating hours that could be evaluated. Compressor 1 operated nearly continuously until September 29; compressor 2 operated sporadically. FIG. 6 shows the time-series data for the present invention case.

Compressor Power

Observations of compressor kW, delta enthalpy across the coil (delivered cooling), and outdoor air temperature were calculated from the time-series data. Observations were filtered to capture steady-state operation (one or both compressors operating for 15 minutes of a 15 minute interval). Observations were segregated into outdoor air temperature bins of 5° F. (e.g. the 70° F. bin includes observations where air temperature ranges from 67.5° F. to 72.5° F.).

Figure 7:
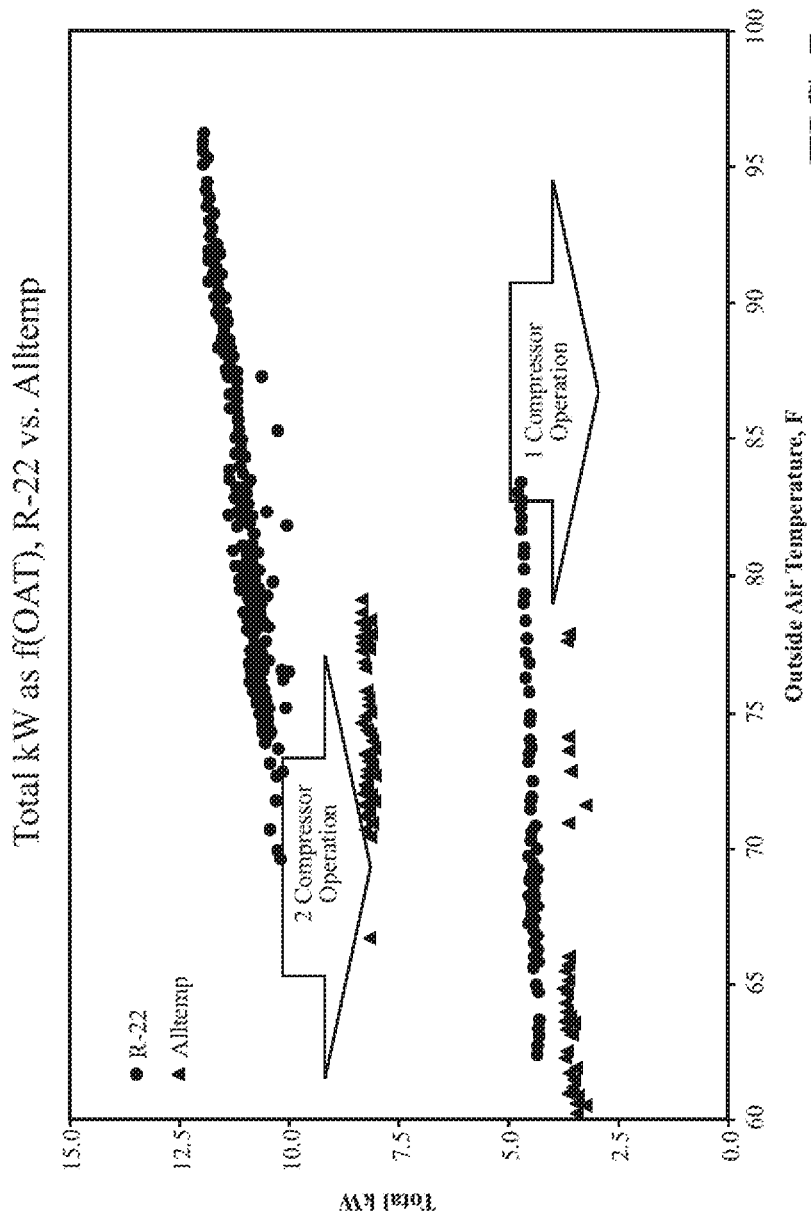
FIG. 7 is a kW/Outside Air Temperature graph which illustrates the change in compressor power over a range of outdoor temperatures comparing R-22 to the refrigerant of the present invention.

FIG. 7 illustrates the change in compressor power over a range of outdoor temperatures. The compressor power in for both one and two compressor operation is seen to decrease over all temperature ranges observed between the R-22 and the present invention cases.

Table 1 shows the statistical comparison of compressor power (kW) as a function of outdoor air temperature for two compressor operations. Compressor power is reduced by an average of 22% (20%-24%) over all observed temperature ranges for two compressor operations. The power decrease was statistically significant ($|t|\gg2$) for all temperature bins.

TABLE 1

Comparison of Compressor Power, 2 Compressor Operation

| Temperature Bin | R-22 | | | Alltemp | | | Difference | | |
|---|---|---|---|---|---|---|---|---|---|
| | n | Average kW | Std Dev | n | Average kW | Std Dev | kW | kW, % | t Statistic |
| 65 | | | | 1 | 8.17 | | | | |
| 70 | 6 | 10.23 | 0.10 | 40 | 8.16 | 0.06 | −2.07 | −20% | −47.3 |
| 75 | 138 | 10.60 | 0.17 | 66 | 8.17 | 0.08 | −2.43 | −23% | −134.9 |
| 80 | 182 | 10.82 | 0.19 | 16 | 8.25 | 0.08 | −2.57 | −24% | −106.3 |
| 85 | 224 | 11.16 | 0.15 | | | | | | |
| 90 | 204 | 11.51 | 0.14 | | | | | | |
| 95 | 122 | 11.83 | 0.09 | | | | | | |

Table 2 shows the statistical comparison of compressor power (kW) as a function of outdoor air temperature for one compressor operation. Compressor power is reduced by an average of 20% (17%-21%) over all observed temperature ranges for one compressor operation. The power decrease was statistically significant ($|t|\gg2$) for all temperature bins.

TABLE 2

Comparison of Compressor Power, 1 Compressor Operation

| Temperature Bin | R-22 | | | Alltemp | | | Difference | | |
|---|---|---|---|---|---|---|---|---|---|
| | n | Average kW | Std Dev | n | Average kW | Std Dev | kW | kW, % | t Statistic |
| 55 | | | | 1 | 3.05 | | | | |
| 60 | 3 | 4.33 | 0.01 | 40 | 3.51 | 0.09 | −0.82 | −19% | −57.0 |
| 65 | 108 | 4.38 | 0.06 | 52 | 3.66 | 0.05 | −0.72 | −17% | −83.5 |
| 70 | 347 | 4.46 | 0.07 | 217 | 3.62 | 0.07 | −0.84 | −19% | −132.5 |
| 75 | 307 | 4.56 | 0.07 | 101 | 3.70 | 0.07 | −0.86 | −19% | −108.4 |
| 80 | 144 | 4.70 | 0.08 | 5 | 3.71 | 0.01 | −0.99 | −21% | −108.3 |
| 85 | 28 | 4.75 | 0.04 | | | | | | |

Figure 8:
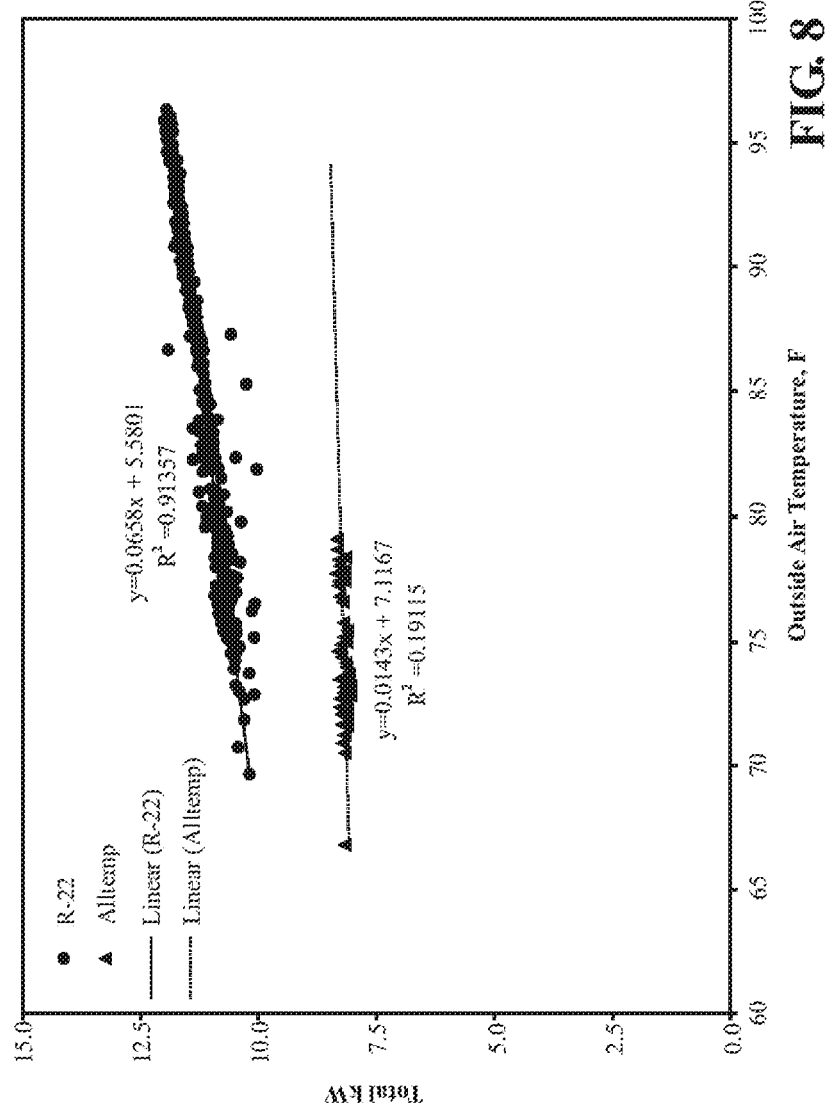
FIG. 8 is a kW/Outside Air Temperature graph which illustrates the temperature sensitivity during two compressor operation comparing R-22 to the refrigerant of the present invention.
Figure 9:
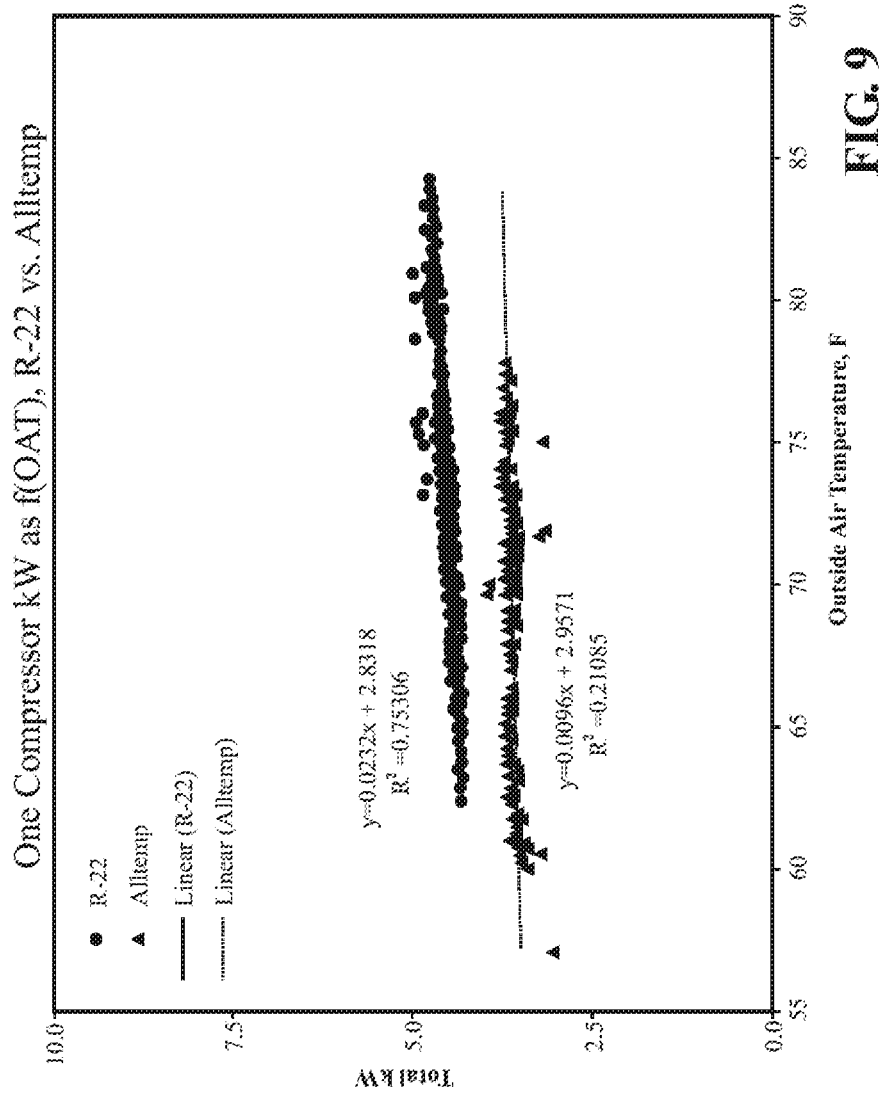
FIG. 9 is a kW/Outside Air Temperature graph which illustrates the temperature sensitivity during one compressor operation comparing R-22 to the refrigerant of the present invention.

Although system operation with outdoor temperatures exceeding 80° F. using the present invention were not observed, it appears that the power reduction will be greater than that observed during warm and hot conditions. FIG. 8 and FIG. 9 show that compressor power with R-22 increases with ambient outdoor temperature; the correlation coefficient r2 is greater than 0.7 indicating a very strong relationship. Temperature dependency of compressor power with the present invention is much less over the observed temperature range (r2<0.22). Extrapolations of the present inventions performance at higher ambient temperatures appear promising but performance estimates at higher temperatures are speculative. Additional observation at higher ambient temperatures is required.

Sensible Cooling

Figure 10:
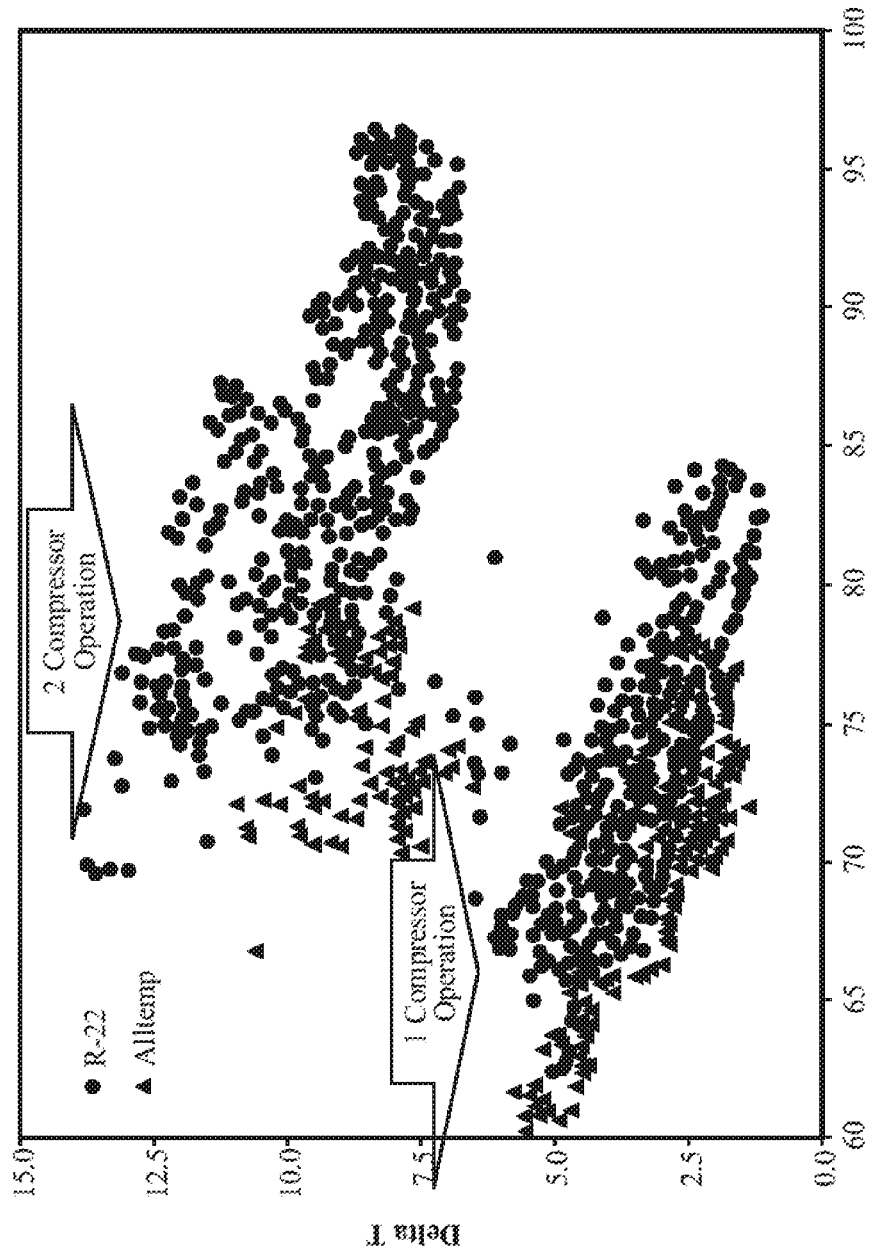
FIG. 10 is a chart that shows the change in delta T across the cooling coil over a range of outdoor conditions.

A simple metric for delivered cooling is the decrease in air temperature (delta T) across the cooling coil—the sensible cooling effect. Sensible cooling ignores any change in humidity level. Small changes in sensible cooling were observed when operating with the present invention at some temperature ranges. FIG. 10 shows the change in delta T across the cooling coil over a range of outdoor conditions.

Table 3 shows the variation in delta T across the cooling coil over a range of outdoor conditions. During two-compressor operation with R-22, the supply air temperature increases while delta T decreases (reduced sensible cooling) as outdoor temperatures increase. With the present invention, the supply air temperature remains nearly constant at 59° F. to 61° F. over the observed outdoor temperature range. The present invention appears to have a reduced sensible cooling capacity at lower ambient temperature conditions when it would have the least effect on comfort. If the supply air temperature is less sensitive to ambient conditions, it should provide a greater cooling effect at higher ambient temperatures when it is needed most. Observation at higher ambient temperatures will be needed to confirm this.

The performance change with only one compressor operating is less pronounced. Supply air temperature shifts and changes in delta T were similar between the R-22 and the present invention cases. While the differences were statistically significant (|t|>2) in 4 of 5 cases, the shifts were small in 3 of 5.

Looking next to Table 5 (there is no Table 4), we review the total cooling.

Total Cooling

Figure 11:
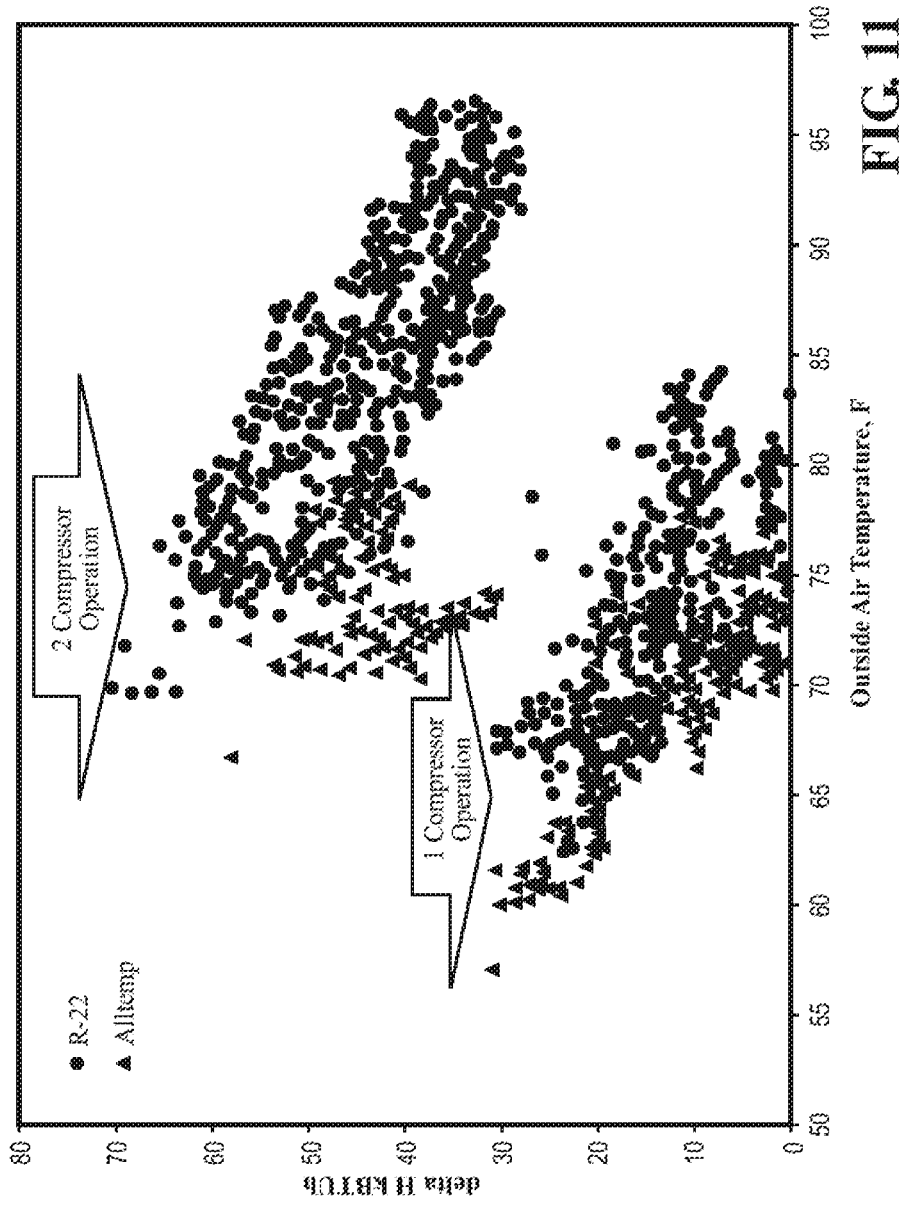
FIG. 11 is a chart showing delivered cooling as a result of outside air temperature.

A better indicator of delivered cooling effect is the change in enthalpy, which considers the energy content of air including humidity. Change in enthalpy was calculated from temperature and relative humidity measurements across the cooling coil. Airflow was not measured but was assumed to be equal to the nameplate value, which means the measured cooling effect may not be exact. FIG. 11 shows a slight shift in delivered cooling as outside air temperature increases.

Changes in measured enthalpy values show far greater variation than compressor power measurements. Table 5 shows a decrease in delivered cooling, which appears to be the greatest when outdoor temperatures are the coolest. The trend suggests that this decrease is less pronounced at higher ambient temperatures. Table 5 and Table 6 show this performance shift, with Table 5 supporting the trend towards less decrease at higher temperatures while Table 6 is indeterminate.

TABLE 3

Supply Air Delta T Across Cooling Coil, 2 Compressor Operation

| | R-22 | | | | Alltemp | | | | Difference | |
| --- | --- | --- | --- | --- | --- | --- | --- | --- | --- | --- |
| Temperature Bin | n | Supply Air Temp, F. | Average ΔT | Std Dev | n | Supply Air Temp, F. | Average ΔT | Std Dev | ΔΔT | ΔΔT, % | t Statistic |
| 65 | | | | | 1 | 59.04 | 10.56 | | | | |
| 70 | 6 | 56.28 | 13.12 | 0.86 | 40 | 60.36 | 8.82 | 0.98 | −4.30 | −33% | −11.2 |
| 75 | 138 | 59.13 | 10.53 | 1.38 | 66 | 60.68 | 8.03 | 0.81 | −2.50 | −24% | −16.2 |
| 80 | 182 | 60.39 | 9.54 | 1.07 | 16 | 61.85 | 8.74 | 0.78 | −0.81 | −8% | −3.8 |
| 85 | 224 | 61.81 | 8.63 | 1.29 | | | | | | | |
| 90 | 204 | 63.95 | 7.97 | 0.68 | | | | | | | |
| 95 | 122 | 65.60 | 7.92 | 0.49 | | | | | | | |

TABLE 5

Change in Cooling Output with Outside Temperature, 2 Compressor Operation

| | R-22 | | | Alltemp | | | Difference | | |
| --- | --- | --- | --- | --- | --- | --- | --- | --- | --- |
| Temperature Bin | n | Average kBTUh | Std Dev | n | Average kBTUh | Std Dev | kBTUh | kBTUh, % | t Statistic |
| 65 | | | | 1 | 58.15 | | | | |
| 70 | 6 | 67.18 | 2.48 | 40 | 44.08 | 5.73 | −23.10 | −34% | −17.0 |
| 75 | 138 | 52.91 | 6.21 | 66 | 40.51 | 5.43 | −12.40 | −23% | −14.6 |

TABLE 5-continued

Change in Cooling Output with Outside Temperature, 2 Compressor Operation

| Temperature Bin | R-22 | | | Alltemp | | | Difference | | t Statistic |
|---|---|---|---|---|---|---|---|---|---|
| | n | Average kBTUh | Std Dev | n | Average kBTUh | Std Dev | kBTUh | kBTUh, % | |
| 80 | 182 | 47.69 | 6.11 | 16 | 44.22 | 2.98 | −3.47 | −7% | −4.0 |
| 85 | 224 | 41.12 | 6.24 | | | | | | |
| 90 | 204 | 37.16 | 4.16 | | | | | | |
| 95 | 122 | 35.20 | 3.28 | | | | | | |

TABLE 6

Change in Cooling Output with Outside Temperature, 1 Compressor Operation

| Temperature Bin | R-22 | | | Alltemp | | | Difference | | t Statistic |
|---|---|---|---|---|---|---|---|---|---|
| | n | Average H. kBTUh | Std Dev | n | Average H. kBTUh | Std Dev | $\Delta$H kBTUh | $\Delta$H kBTUh, % | |
| 55 | | | | 1 | 31.08 | | | | |
| 60 | 3 | 23.61 | 0.35 | 40 | 26.00 | 2.48 | 2.38 | 10% | −5.4 |
| 65 | 108 | 20.10 | 3.53 | 52 | 18.90 | 4.17 | −1.20 | −6% | −1.8 |
| 70 | 347 | 15.31 | 5.04 | 217 | 6.84 | 4.15 | −8.47 | −55% | −21.7 |
| 75 | 307 | 10.23 | 6.08 | 101 | 5.64 | 3.45 | −4.59 | −45% | −9.4 |
| 80 | 144 | 6.37 | 5.75 | 5 | 11.32 | 0.68 | 4.95 | 78% | 8.7 |
| 85 | 28 | 7.58 | 6.64 | | | | | | |

Although many of the cases in Table 6 appear statistically significant, there is no clear trend with outside air temperature as there is for the other metrics. Uncertainty analysis suggests that this is due to instrumentation bias as small changes (one compressor operation) in absolute humidity is smaller than the combined measurement error. The data loggers used have a temperature accuracy of +0.4° F. and a humidity accuracy of ±2.5%. This translates to an uncertainty in the enthalpy estimate of +3.5% for each data logger. When calculating the change in enthalpy ($\Delta$H), the uncertainty is +5%. With one compressor operation, the $\Delta$H across the coil is small enough that instrumentation error introduces significant uncertainties into the result.

Dehumidification

Figure 12:
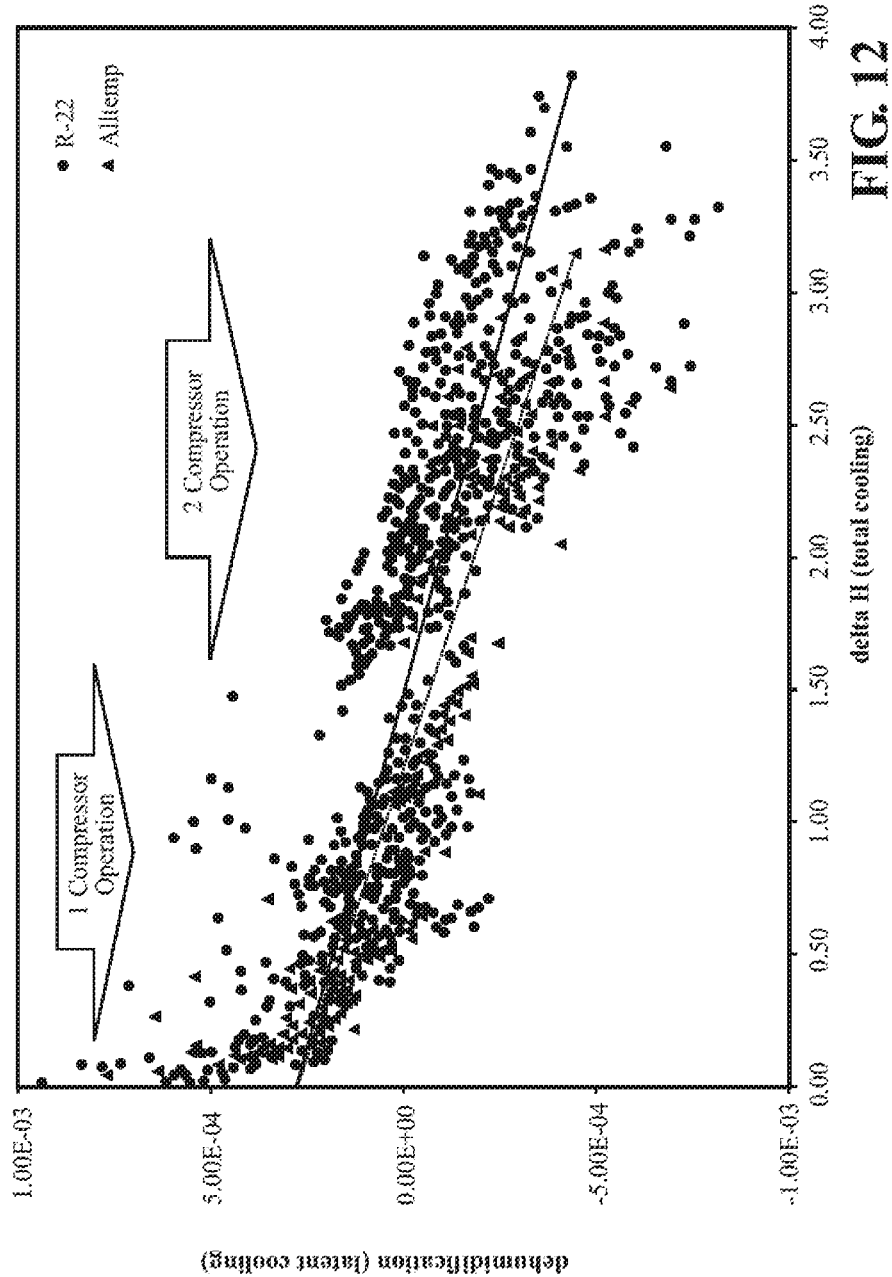
FIG. 12 is a chart showing latent cooling as a function of total cooling.
Figure 13:
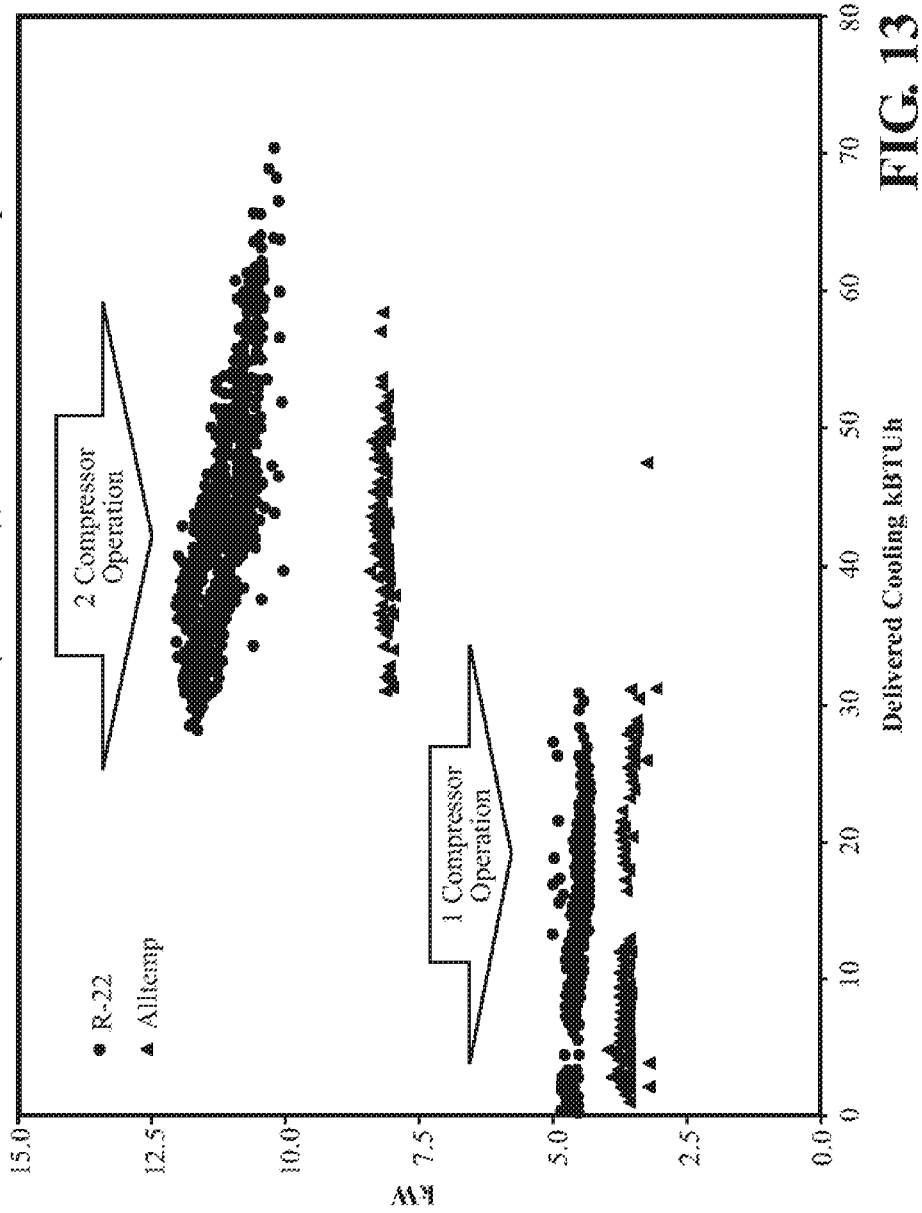
FIG. 13 is a chart showing specific compressor operation performance results.

The dehumidification performance between R-22 and the present invention was evaluated by comparing the humidity reduction (latent cooling) to the change in enthalpy ($\Delta$H, total cooling) rather than outside air temperature. Dehumidification capability is primarily a function of the cooling coil geometry and airflow, typically defined as the Sensible Heat Ratio. FIG. 12 shows that the dehumidification capabilities of the coil appears independent of the refrigerant used. Changes in dehumidification appear as different slopes. The difference in trend lines is not statistically significant.

Figure 14:
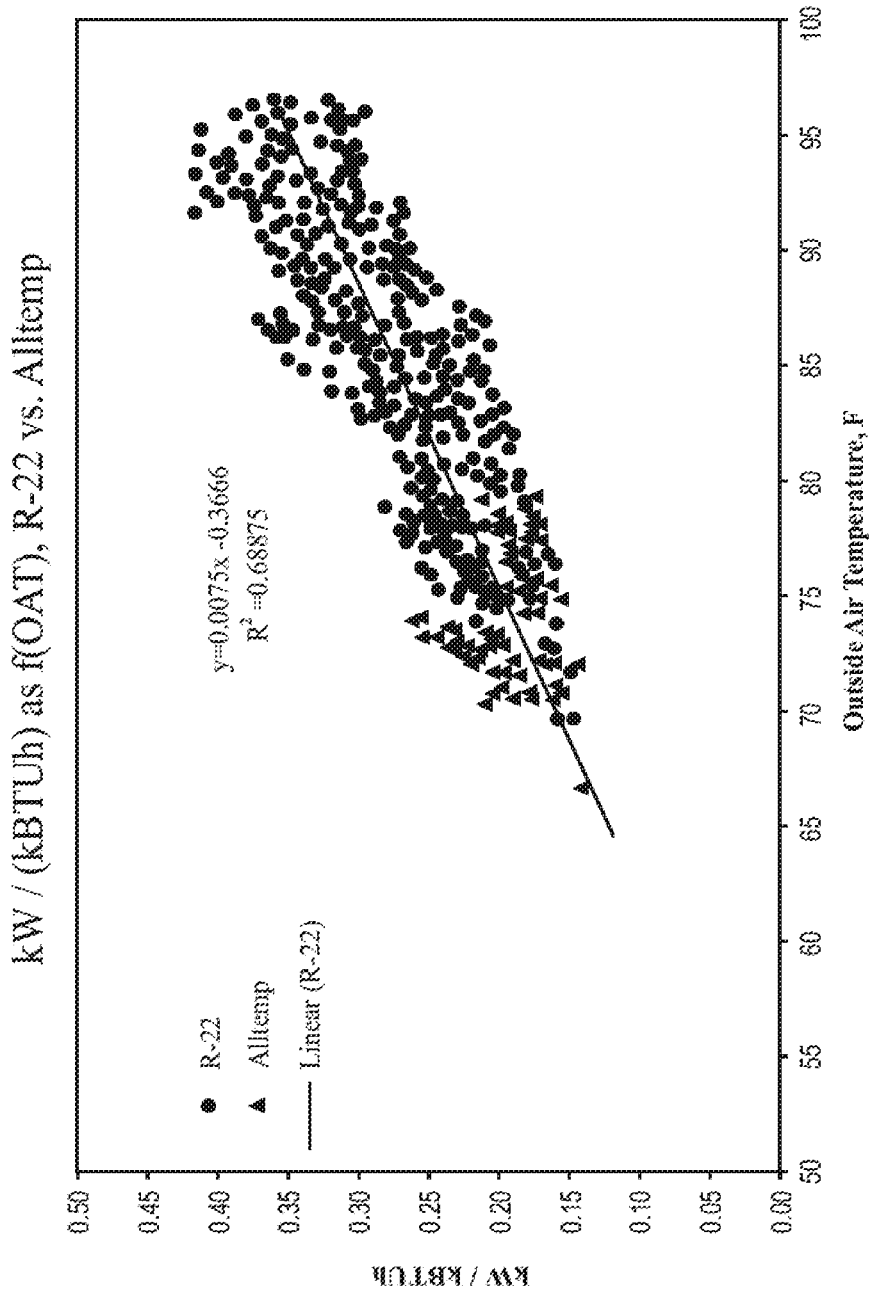
FIG. 14 is a chart showing specific two (2) compressor performance.

Another way of looking at performance changes is to review compressor power as a function of cooling provided. FIG. 14 shows that kW/kBTUh increases linearly over the range of observed temperatures for 2-compressor operation when using R-22. The temperature range using the present invention was not sufficiently large to draw any conclusions, seeming to perform as well as R-22 in most cases in the 70° F.-80° F. range. The one area where the present invention appears to have a higher kW/kBTUh (>0.2) all occurred during the afternoon of Sep. 24, 2015 for reasons not yet understood.

Due to the lack of observations of the present invention above 80° F., it is difficult draw conclusions as to the specific performance. Table 8 below shows that at 70° F. R-22 has the lower kW/kBTUh, at 75° F. the refrigerants appear equal and at 80° F. the present invention has the lower kW/kBTUh. R-22 does show a trend toward increasing kW/kBTUh (decreasing performance) with higher outdoor temperatures. The present invention appears to maintain a constant performance over the limited temperature range observed, but observations at higher ambient temperatures would be required to confirm this.

TABLE 8

Specific Performance as a Function of Outdoor Air Temperature

| Compressors: 2 Temperature Bin | R-22 | | | Alltemp | | | Difference | | t Statistic |
|---|---|---|---|---|---|---|---|---|---|
| | n | Average kW/ kBTUh | Std Dev | n | Average kW/ kBTUh | Std Dev | $\Delta$kW/ kBTUh | $\Delta$kW/ KBTUh, % | |
| 65 | | | | 1 | 0.14 | | | | |
| 70 | 6 | 0.15 | 0.01 | 40 | 0.19 | 0.02 | 0.04 | 23% | 8.1 |

TABLE 8-continued

Specific Performance as a Function of Outdoor Air Temperature

| Compressors: 2 Temperature Bin | R-22 | | | Alltemp | | | Difference | | |
|---|---|---|---|---|---|---|---|---|---|
| | n | Average kW/ kBTUh | Std Dev | n | Average kW/ kBTUh | Std Dev | ΔkW/ kBTUh | ΔkW/ KBTUh, % | t Statistic |
| 75 | 138 | 0.20 | 0.03 | 66 | 0.21 | 0.03 | 0.00 | 1% | 0.5 |
| 80 | 182 | 0.23 | 0.03 | 16 | 0.19 | 0.01 | −0.04 | −19% | −10.7 |
| 85 | 224 | 0.28 | 0.04 | | | | | | |
| 90 | 204 | 0.31 | 0.04 | | | | | | |
| 95 | 122 | 0.34 | 0.03 | | | | | | |
| Overall | 876 | 42.77 | 8.40 | 123 | 42.30 | 5.71 | −0.48 | −1% | −0.8 |

Figure 15:
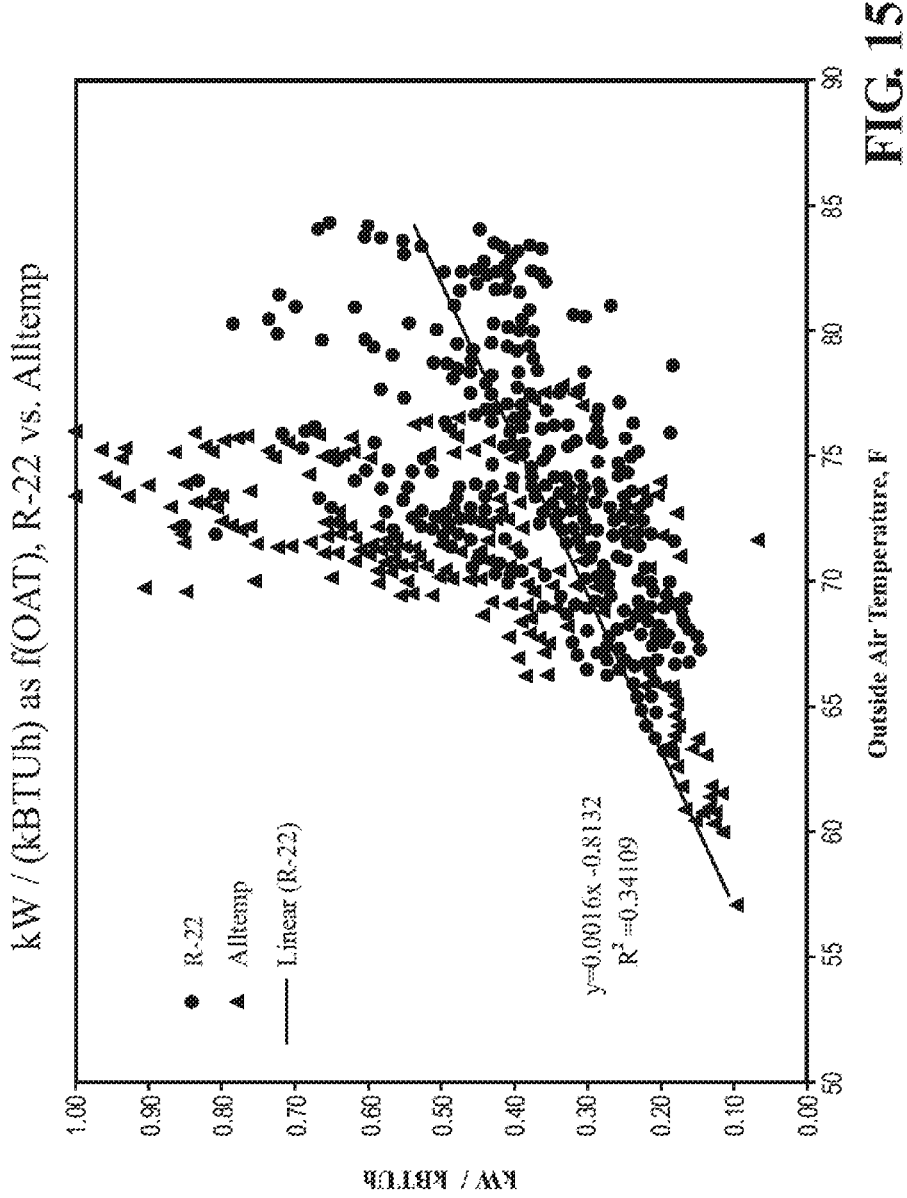
FIG. 15 is a chart showing specific one (1) compressor performance.

For 1 compressor operation, evaluating specific performance was complicated by small changes in enthalpy resulting in very large values of kW/kBTUh. In many cases, the enthalpy change appeared negative resulting in negative values of kW/kBTUh. At low-load conditions, the measurement uncertainty and/or the placement of the data loggers introduced a small bias that caused these results. To remove their influence, data points with 1 compressor operation resulting in kW/kkBTUh values greater than one or less than zero were removed. In all, points from R-22 observations and 66 points from the present inventions observations were removed. FIG. 15 shows the specific performance with the aforementioned points removed. Even with the constraints provided, there are still a significant number of observations with kW/kBTUH>0.5 that appear to be out of range.

FIG. 15 shows the specific performance during one compressor operation using the filtered data set. R-22 does show a trend towards increasing kW/kBTUh with increasing outdoor temperature. The present invention shows a similar trend except for the few observations at 80° F. The differences do show the specific performance of the present invention to have a higher kW per kBTUh, but a review of Table 11 suggests that it is more likely an artifact of measurement uncertainty at low load conditions than a real performance difference.

Energy Savings

Figure 16:
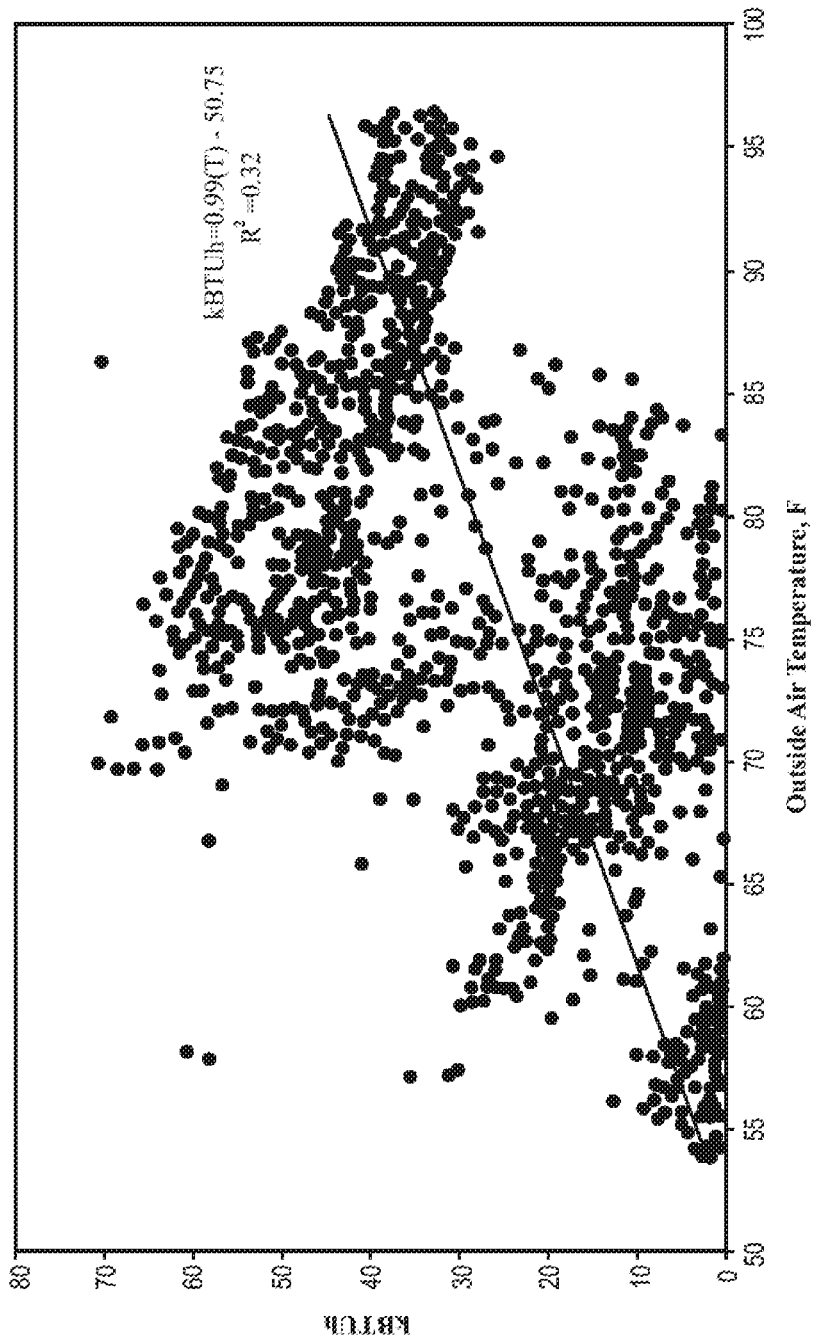
FIG. 16 is a chart showing thermal load.

Although reductions in power were noted at different loads, estimating annual energy savings requires consideration of building loads and their frequency of occurrence. A simple load model of the building was developed by comparing delivered cooling loads as a function of outdoor air temperature. Load observations were combined from both the R-22 and the present inventions data as required cooling is independent of refrigerant. FIG. 16 shows the delivered cooling to the space as a function of outdoor air temperature. These observations include period when the AC unit was off as well as when it only operated for a portion of each 15-minute interval. As the unit is enabled 24/7, no data was eliminated for scheduling reasons. Because the regression model is very weak (r2<0.4), the delivered cooling load (kBTUh) was averaged by temperature bin. Periods where the unit is off for some or all of the 15-minute interval reflect actual operation of the AC unit is response to loads.

Table 10 shows the thermal load model; the amount of cooling required at each temperature bin. The standard deviation of the load is very high at low ambient temperatures but will still be used for estimating purposes.

To estimate the number of hours that the unit is expected to operate for each load range, Typical Metrological Year (TMY) weather data for Chicago, Ill. (Midway Airport). Weather data was the parsed into temperature bins and the typical number of hours at each bin calculated.

Figure 17:
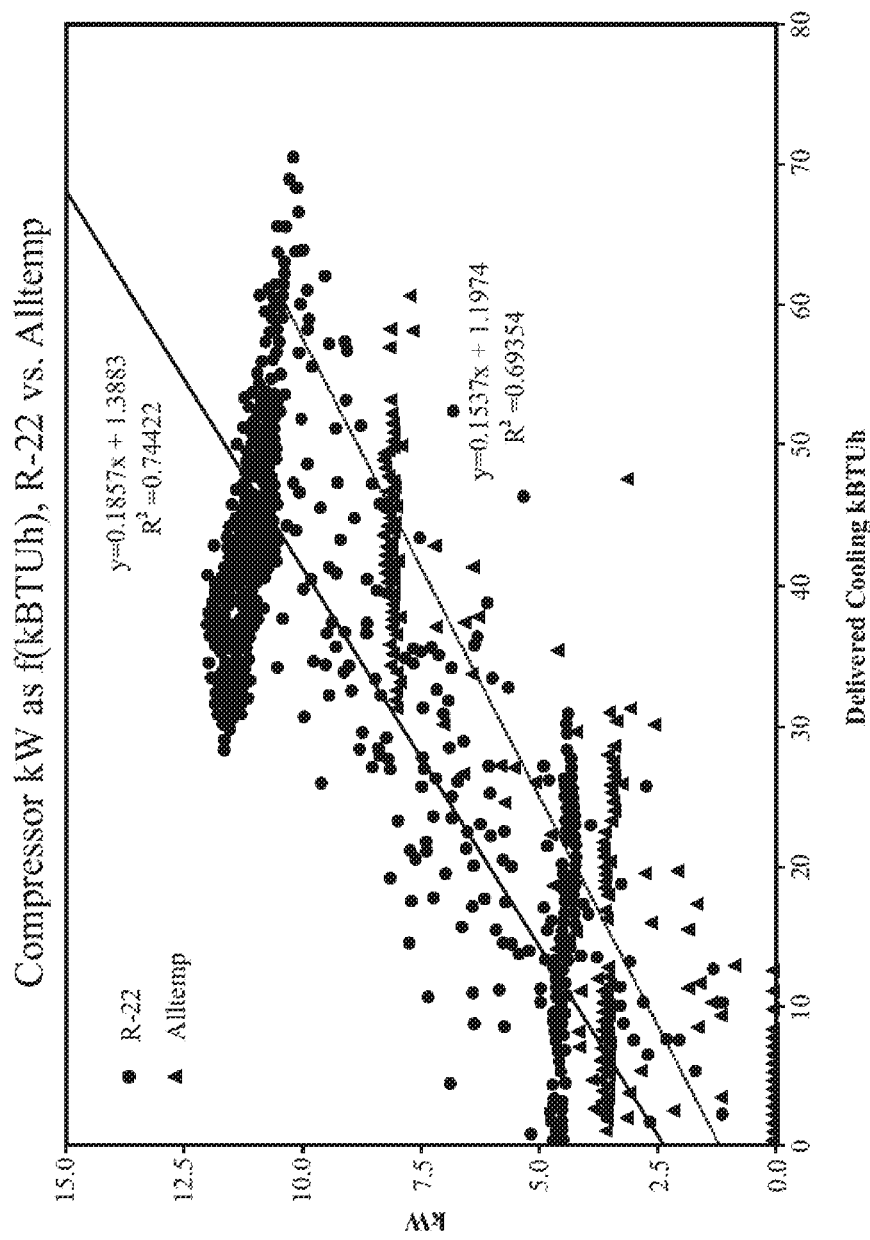
FIG. 17 is a chart showing compressor kW as a function of cooling load.

The next step was to calculate the average compressor power (kW) at each expected load range. FIG. 17 shows the average compressor power as a function of delivered cooling for all observations (including periods when the compressors were off).

TABLE 11

TMY Weather Data for Chicago, IL

| Temp bin, F. | January | February | March | April | May | June | July | August | September | October | November | December | Hours |
|---|---|---|---|---|---|---|---|---|---|---|---|---|---|
| −15 | | 14 | | | | | | | | | | | 14 |
| −10 | | 26 | | | | | | | | | | | 26 |
| −5 | 9 | 18 | | | | | | | | | | | 27 |
| 0 | 36 | 24 | | | | | | | | | | 7 | 67 |
| 5 | 69 | 13 | | | | | | | | | | 11 | 93 |
| 10 | 81 | 16 | 3 | | | | | | | | | 79 | 179 |
| 15 | 50 | 19 | 29 | | | | | | | | | 19 | 117 |
| 20 | 132 | 53 | 28 | | | | | | | | | 76 | 289 |
| 25 | 120 | 73 | 37 | | | | | | | | 7 | 87 | 324 |
| 30 | 112 | 78 | 64 | | | | | | | | 30 | 98 | 382 |
| 35 | 73 | 110 | 111 | 3 | | | | | | 18 | 98 | 153 | 566 |
| 40 | 15 | 69 | 173 | 36 | 8 | | | | | 22 | 101 | 66 | 490 |
| 45 | 23 | 92 | 109 | 197 | 48 | | | | | 108 | 175 | 83 | 835 |
| 50 | 12 | 37 | 66 | 181 | 200 | 50 | | | 3 | 162 | 102 | 45 | 858 |
| 55 | 6 | 22 | 54 | 136 | 201 | 100 | | | 39 | 188 | 82 | 20 | 848 |
| 60 | 6 | 8 | 32 | 69 | 87 | 40 | 7 | 10 | 58 | 60 | 38 | | 415 |
| 65 | | | 18 | 63 | 117 | 93 | 67 | 46 | 183 | 53 | 51 | | 691 |

TABLE 11-continued

TMY Weather Data for Chicago, IL

| Temp bin, F. | January | February | March | April | May | June | July | August | September | October | November | December | Hours |
|---|---|---|---|---|---|---|---|---|---|---|---|---|---|
| 70 | | | 14 | 20 | 71 | 108 | 110 | 221 | 177 | 53 | 24 | | 798 |
| 75 | | | 6 | 14 | 5 | 98 | 198 | 213 | 136 | 34 | 12 | | 716 |
| 80 | | | | 1 | 5 | 118 | 200 | 162 | 68 | 29 | | | 583 |
| 85 | | | | | 2 | 58 | 94 | 37 | 27 | 15 | | | 233 |
| 90 | | | | | | 50 | 53 | 49 | 27 | 2 | | | 181 |
| 95 | | | | | | 5 | 8 | 6 | 2 | | | | 21 |
| 100 | | | | | | | 6 | | | | | | 6 |
| 105 | | | | | | | 1 | | | | | | 1 |
| Total | 744 | 672 | 744 | 720 | 744 | 720 | 744 | 744 | 720 | 744 | 720 | 744 | 8,760 |

Linear regression models were developed to estimate compressor kW as a function of delivered cooling load. Table 12 shows the regression model coefficients. The models for each refrigerant are acceptable ($r^2 > 0.7$).

Combining the results of the TMY weather bin data, estimated cooling loads from the thermal model, and the average kW from the R-22 and the present inventions linear regression models allows estimating the energy use reduction at each bin temperature. In Table 13, energy use savings were calculated from ambient temperatures ranging from 60° F. to 105° F. As there

TABLE 12

Regression Model Coefficients

| Model | Slope | Intercept | $r^2$ | n |
|---|---|---|---|---|
| R-22 | 0.18533 | 2.38832 | 0.74409 | 2,044 |
| Alltemp | 0.15263 | 1.19744 | 0.69317 | 845 | were no observations in the 100° F. or 105° F. bins, these values were estimated from the 90° F. bin. The decrease in cooling load from 90° F. to 95° F. is a result of the decreased cooling capacity of R-22 and not a function of the thermal load model. An alternative savings calculation method that skipped the thermal load model was evaluated but rejected. It compared the average compressor kW at each temperature bin, which implicitly includes the thermal load. However, the lack of observations above 80° F. using the present invention biased one of the models and resulted in a savings of only 12%. As all reported savings values are estimates, the methodology used here represent the upper limit of the probable savings while 12% represents the lower limit. The alternative method that yielded 12% savings is less reliable.

Therefore, in accordance with the present invention, a refrigerant composition comprising a heat transfer fluid is disclosed comprising a coordination entity with a refrigerant solvent and a fatty acid solute including at least one activated organic oil, a heat transfer fluid; and where the coordination entity is a reverse micellar configuration yielding an energy saving refrigerant composition. Especially, the at least one activated organic oil may comprise at least one oleic acid and at least one linoleic acid. The composition may comprise a polar heat transfer fluid to activated oil blend ratio of between 5:95 and 1:99 by weight percent.

The at least one organic oil may include a blend of a walnut oil and a canola oil, or it may further include a third organic oil, and wherein the third organic oil may be an almond oil. In one aspect of the present invention, the activated oil blend may include a linoleic acid to oleic acid blend having a ratio of between 70:30 and 50:50. The at least one organic oil further comprises canola oil and sunflower oil, wherein the composition including the canola oil and the sunflower oil may be present in a ratio of 3:1.

TABLE 13

Estimated Energy Savings

| Temp bin, F. | TMY Hours | Estimated Cooling Load kBTUh | Est. kW, R-22 | Est. kW, Alltemp | ΔkW | Est. kWh R-22 | Est. kWh Alltemp | ΔkWh |
|---|---|---|---|---|---|---|---|---|
| 60 | 415 | 7.0 | 3.68 | 2.26 | 1.42 | 1,526 | 937 | 589 |
| 65 | 691 | 19.0 | 5.92 | 4.10 | 1.81 | 4,087 | 2,834 | 1,253 |
| 70 | 798 | 15.8 | 5.32 | 3.61 | 1.71 | 4,246 | 2,883 | 1,363 |
| 75 | 716 | 24.3 | 6.90 | 4.91 | 1.99 | 4,937 | 3,515 | 1,422 |
| 80 | 583 | 30.9 | 8.12 | 5.92 | 2.20 | 4,733 | 3,449 | 1,284 |
| 85 | 233 | 37.2 | 9.28 | 6.88 | 2.41 | 2,163 | 1,602 | 561 |
| 90 | 181 | 37.2 | 9.27 | 6.87 | 2.41 | 1,679 | 1,243 | 436 |
| 95 | 21 | 35.1 | 8.90 | 6.56 | 2.34 | 187 | 138 | 49 |
| 100 | 6 | 37.0* | 9.24 | 6.84 | 2.40 | 55 | 41 | 14 |
| 105 | 1 | 37.0* | 9.24 | 6.84 | 2.40 | 9 | 7 | 2 |
| Total | 3645 | | | | | 23,623 | 16,650 | 6,973 |
| % Savings | | | | | | | | 30.00% |
| Cost, $/kWh | | | | | | $0.07 | $0.07 | $0.07 |
| Cost, Cost Savings | | | | | | $1,654.00 | $1,165.00 | $488.00 |

As used herein, and unless the context dictates otherwise, the term "coupled to" is intended to include both direct coupling (in which two elements that are coupled to each other contact each other) and indirect coupling (in which at least one element is interposed between the two elements). Therefore, the terms "coupled to" and "coupled with" are used synonymously.

It should be noted that one having ordinary skill in the art should realize that all numbers herein are approximates, regardless or whether or not the numbers are preceded by the word "approximately".

In some aspects, the numbers expressing quantities of ingredients, properties such as concentration, reaction conditions, and so forth, used to describe and claim certain aspects of the invention are to be understood as being modified in some instances by the term "about." Accordingly, in some aspects, the numerical parameters set forth in the written description and attached claims are approximations that can vary depending upon the desired properties sought to be obtained by a particular aspect. In some aspects, the numerical parameters should be construed in light of the number of reported significant digits and by applying ordinary rounding techniques. Notwithstanding that the numerical ranges and parameters setting forth the broad scope of some aspects of the invention are approximations, the numerical values set forth in the specific examples are reported as precisely as practicable. The numerical values presented in some aspects of the invention may contain certain errors necessarily resulting from the standard deviation found in their respective testing measurements.

Unless the context dictates the contrary, all ranges set forth herein should be interpreted as being inclusive of their endpoints, and open-ended ranges should be interpreted to include commercially practical values. Similarly, all lists of values should be considered as inclusive of intermediate values unless the context indicates the contrary. All methods described herein can be performed in any suitable order unless otherwise indicated herein or otherwise clearly contradicted by context. The use of any and all examples, or exemplary language (e.g. "such as") provided with respect to certain aspects herein is intended merely to better illuminate the invention and does not pose a limitation on the scope of the invention otherwise claimed. No language in the specification should be construed as indicating any non-claimed element essential to the practice of the invention.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

INDUSTRIAL APPLICABILITY

The present invention finds utility in refrigeration systems, air conditioning units, medical applications and other industrial applications.

What is claimed is:

1. A refrigerant composition comprising a heat transfer fluid, comprising:
    a coordination entity with refrigerant solvent catalytically reacted with a blended and activated fatty acid solute to yield a reverse micellar configuration, said fatty acid solute including an activated organic oil blend, said activated organic oil blend comprising at least one oleic acid and at least one linoleic acid; and
    a polar heat transfer fluid, said polar heat transfer fluid to activated oil blend ratio being between 5:95 and 1:99 by weight percent;
wherein said fatty acid is a substituted or non-substituted, saturated or unsaturated, carboxylic acid with a long aliphatic tail having from 10 to 20 carbons in the aliphatic chain;
    said coordination entity yielding an energy saving refrigerant composition.

2. The composition of claim 1, wherein the coordination entity is formed in the presence of a Nylon catalyst.

3. The composition of claim 1, wherein the coordination entity is formed in the presence of a stainless steel catalyst.

4. The composition of claim 1, wherein the at least one activated organic oil comprises a walnut oil and a canola oil.

5. The composition of claim 1, wherein the activated oil blend comprising at least one oleic acid and at least one linoleic acid further comprises a third organic oil, and wherein the third organic oil comprises an almond oil.

6. The composition of claim 5, wherein the activated oil blend comprises a linoleic acid to oleic acid ratio of between 70:30 and 50:50.

7. The composition of claim 1, wherein the polar heat transfer fluid comprises R-134a molecules, chemically known as 1,1,1,2-tetrafluoroethane.

8. The composition of claim 1, wherein the activated organic oil comprises canola oil and sunflower oil.

9. The composition of claim 8, wherein the canola oil and the sunflower oil are present in a ratio of 3:1.

10. The composition of claim 1, wherein the activated organic oil includes a fatty acid comprising at least 14 carbons.

11. The composition of claim 1, wherein the composition comprises a polar heat transfer fluid to activated oil blend ratio of between 99:1 and 95:5 by weight percent.

12. The composition of claim 1, wherein the activated organic oil comprises a fatty acid having at least two carbon-to-carbon double bonds.

13. The composition of claim 1, wherein the coordination entity is formed in the presence of a copper catalyst.

* * * * *